(12) United States Patent
Koike et al.

(10) Patent No.: US 11,418,505 B2
(45) Date of Patent: Aug. 16, 2022

(54) INFORMATION PROCESSING APPARATUS, SYSTEM AND METHOD

(71) Applicants: Kabushiki Kaisha Toshiba, Tokyo (JP); Toshiba Electronic Devices & Storage Corporation, Tokyo (JP)

(72) Inventors: Ryuiti Koike, Kawasaki Kanagawa (JP); Mikio Hashimoto, Tokyo (JP); Atsushi Shimbo, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 492 days.

(21) Appl. No.: 16/270,186

(22) Filed: Feb. 7, 2019

(65) Prior Publication Data

US 2020/0076805 A1    Mar. 5, 2020

(30) Foreign Application Priority Data

Aug. 30, 2018  (JP) .............................. JP2018-161586

(51) Int. Cl.
| | | |
|---|---|---|
| H04L 9/40 | (2022.01) | |
| G06F 11/36 | (2006.01) | |
| G06F 21/12 | (2013.01) | |
| H04L 9/32 | (2006.01) | |
| B60R 25/20 | (2013.01) | |
| G06F 21/60 | (2013.01) | |

(52) U.S. Cl.
CPC ........ *H04L 63/0884* (2013.01); *G06F 11/362* (2013.01); *G06F 11/3664* (2013.01); *G06F 21/12* (2013.01); *H04L 9/3247* (2013.01); *H04L 63/10* (2013.01); *B60R 25/2072* (2013.01); *G06F 21/602* (2013.01); *G06F 2221/0735* (2013.01)

(58) Field of Classification Search
CPC ... H04L 63/0884; H04L 9/3247; H04L 63/10; G06F 11/362; G06F 11/3664; G06F 11/12; G06F 21/602; G06F 2221/0735; B60R 25/2072
See application file for complete search history.

(56) References Cited

U.S. PATENT DOCUMENTS

| | | | |
|---|---|---|---|
| 5,978,937 A | 11/1999 | Miyamori et al. | |
| 6,253,281 B1* | 6/2001 | Hall | G11C 29/74 711/112 |
| 8,935,530 B2 | 1/2015 | Hashimoto et al. | |
| 9,122,859 B1* | 9/2015 | Djabarov | G06F 8/65 |
| 10,142,104 B2* | 11/2018 | De Atley | G06F 21/572 |

(Continued)

FOREIGN PATENT DOCUMENTS

| | | |
|---|---|---|
| JP | H08-255096 A | 10/1996 |
| JP | 2006-323726 A | 11/2006 |

(Continued)

*Primary Examiner* — Ghodrat Jamshidi
(74) *Attorney, Agent, or Firm* — Allen & Overy LLP

(57) ABSTRACT

According to one embodiment, an information processing apparatus is applied to an embedded system in an electric device and includes a first circuit. The first circuit is configured to request a server different from the information processing apparatus to determine whether a debug or software change is possible in response to external access.

19 Claims, 16 Drawing Sheets

(56) References Cited

U.S. PATENT DOCUMENTS

| | | | | |
|---|---|---|---|---|
| 2004/0107374 A1* | 6/2004 | Cooper | ................. | G06F 1/3228 |
| | | | | 713/320 |
| 2005/0050159 A1* | 3/2005 | Suraski | ................. | G06F 11/362 |
| | | | | 709/217 |
| 2012/0260082 A1* | 10/2012 | Bobzin | ................. | G06F 21/572 |
| | | | | 713/100 |
| 2013/0007716 A1* | 1/2013 | Bates | ................... | G06F 11/362 |
| | | | | 717/125 |
| 2015/0212926 A1 | 7/2015 | Maeda et al. | | |
| 2015/0242606 A1* | 8/2015 | Shin | ............... | G01R 31/318588 |
| | | | | 713/182 |
| 2016/0226843 A1 | 8/2016 | Koike et al. | | |
| 2017/0032126 A1 | 2/2017 | Koike et al. | | |
| 2017/0255384 A1 | 9/2017 | Hashimoto et al. | | |
| 2017/0286268 A1* | 10/2017 | Lincoln | ................ | G06F 11/366 |
| 2018/0129584 A1* | 5/2018 | Somasundaram | ..... | G06N 20/00 |
| 2018/0267881 A1* | 9/2018 | Zhang | .................. | G06F 11/366 |
| 2018/0349219 A1* | 12/2018 | Berger | ................ | G06F 11/0784 |
| 2019/0042396 A1* | 2/2019 | Mola | ................... | G06F 11/3632 |
| 2019/0087306 A1* | 3/2019 | Peck | .................. | G06F 11/362 |
| 2019/0102541 A1* | 4/2019 | Jo | ........................ | G06F 21/566 |
| 2019/0138430 A1* | 5/2019 | Smiljanic | ............. | G06F 11/362 |
| 2019/0340103 A1* | 11/2019 | Nelson | ................ | G06F 11/3636 |

FOREIGN PATENT DOCUMENTS

| | | | |
|---|---|---|---|
| JP | 2007-226276 | A | 9/2007 |
| JP | 2013-069053 | A | 4/2013 |
| JP | 2015-141505 | A | 8/2015 |
| JP | 2016-144040 | A | 8/2016 |
| JP | 2017-033149 | A | 2/2017 |
| JP | 2017-156945 | A | 9/2017 |

\* cited by examiner

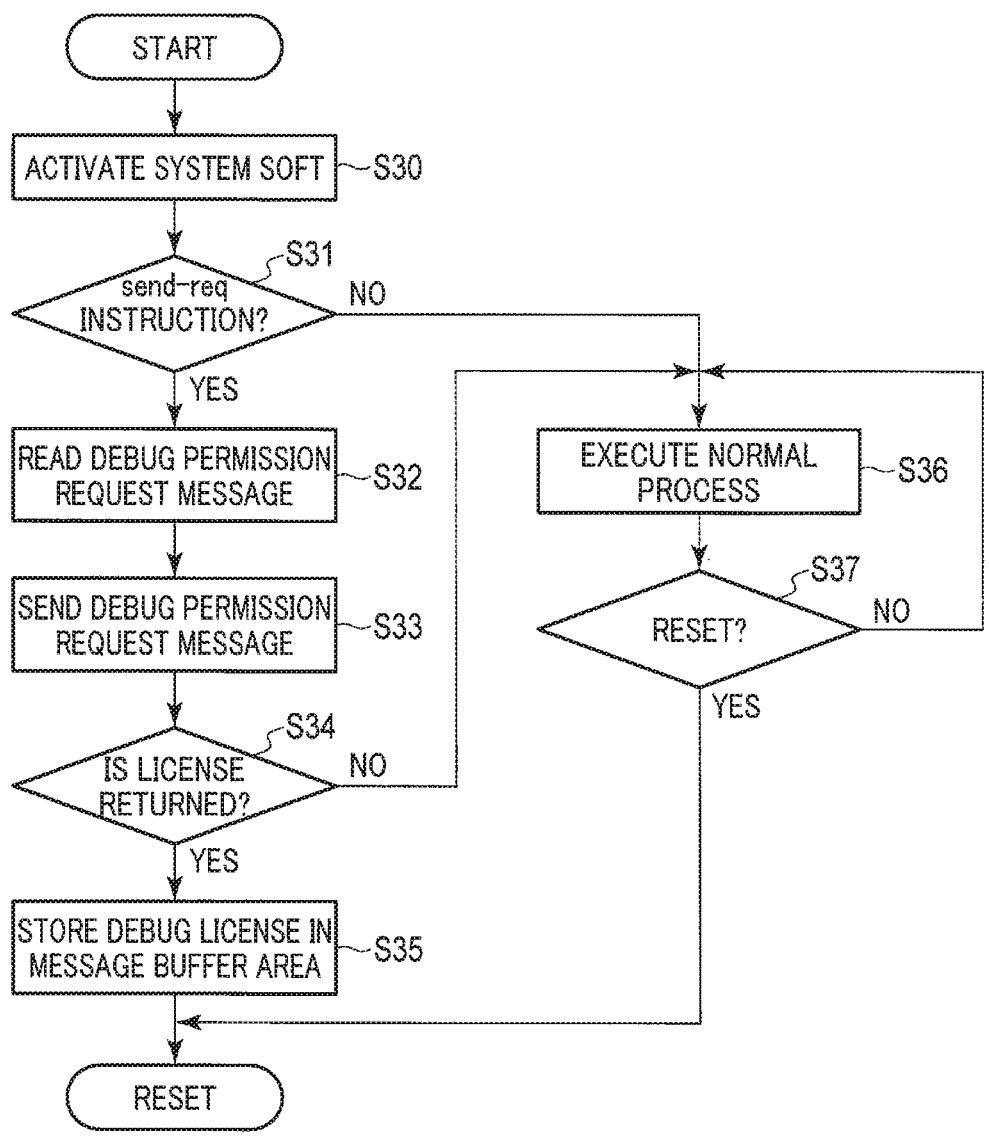

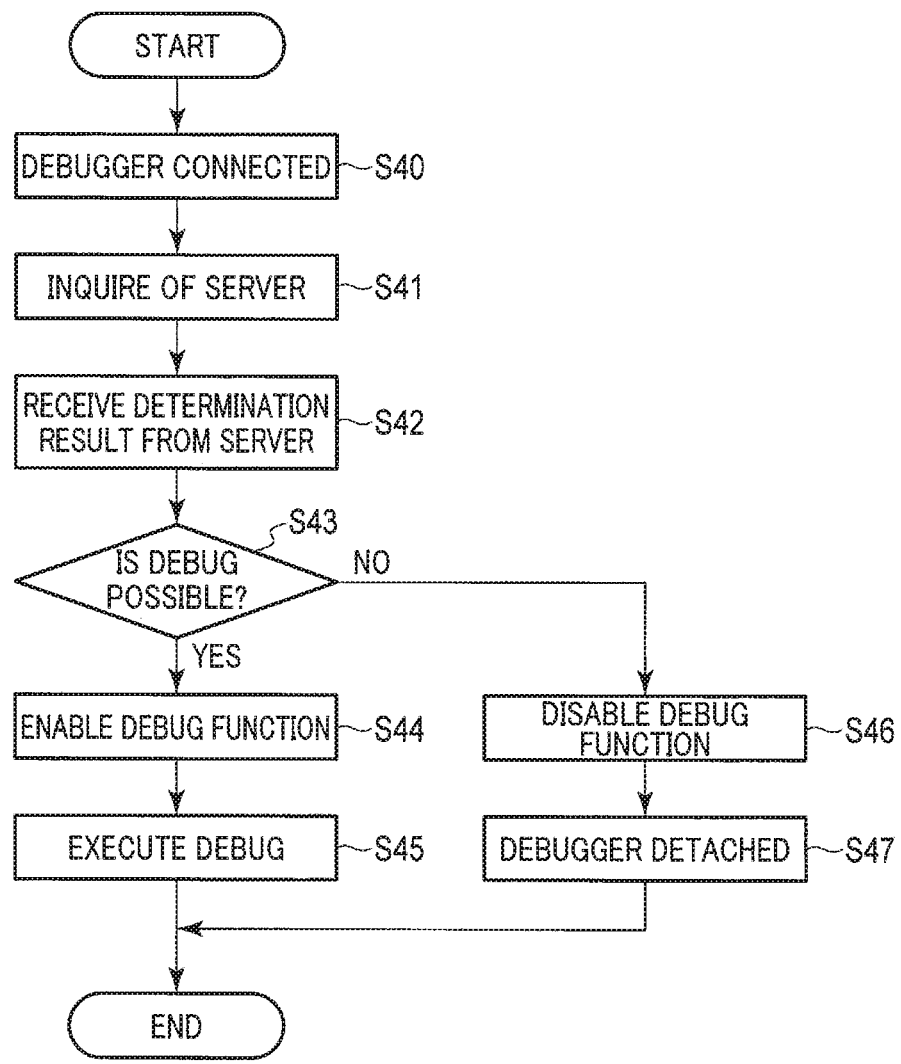
F I G. 13

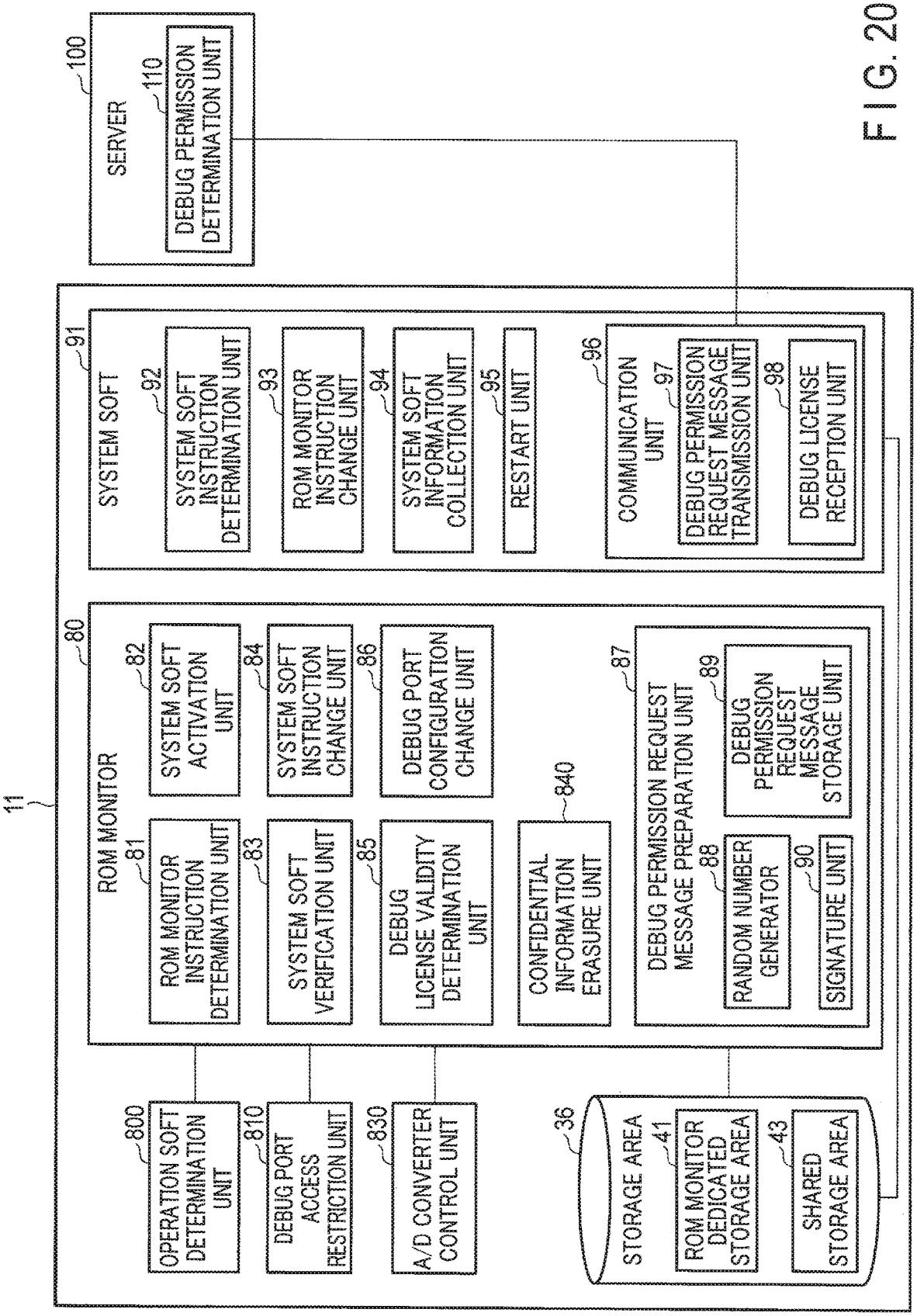

INFORMATION PROCESSING APPARATUS, SYSTEM AND METHOD

CROSS-REFERENCE TO RELATED APPLICATIONS

This application is based upon and claims the benefit of priority from prior Japanese Patent Application No. 2018-161586, filed Aug. 30, 2018, the entire contents of which are incorporated herein by reference.

FIELD

Embodiments described herein relate generally to an information processing apparatus, a system, and a method, which are applied to an embedded system.

BACKGROUND

In recent years, most of various products such as vehicles are equipped with embedded systems that perform computer control. For this reason, security countermeasures against illegal access from the outsider are becoming important to the embedded systems.

Illegal access is specifically to connect a debugger to a microcomputer (microcontroller) of an embedded system and operate software of the microcomputer in a debug mode. Since the outsider can read or write memory contents of the software through the debugger, the outsider can analyze the software operation. In addition to the analysis of the software operation, the outsider can illegally acquire confidential information, or can falsify the software to cause illegal operations.

For security countermeasures of embedded systems, it is desirable to realize an effective access restriction function for illegal debugging. However, from the viewpoint of cost, it is difficult for a low-cost embedded system to incorporate a function that can reliably execute effective access restriction against illegal debugging.

Therefore, it is required to realize an effective access restriction against illegal debugging as a security countermeasure of a low-cost embedded system.

BRIEF DESCRIPTION OF THE DRAWINGS

FIG. 11 is a diagram illustrating a configuration of a debug permission request message according to an embodiment;

FIG. 12 is a flowchart for explaining a process of system soft according to an embodiment;

FIG. 13 is a flowchart for explaining a debug possibility process according to an embodiment;

FIG. 20 is a block diagram relating to a modification of an embodiment.

DETAILED DESCRIPTION

In general, according to one embodiment, an information processing apparatus is applied to an embedded system in an electric device and includes a first circuit.

The first circuit is configured to request a server different from the information processing apparatus to determine whether a debug or software change is possible in response to external access.

Various embodiments will be described hereinafter with reference to the accompanying drawings.

[Configuration of System]

Figure 1:
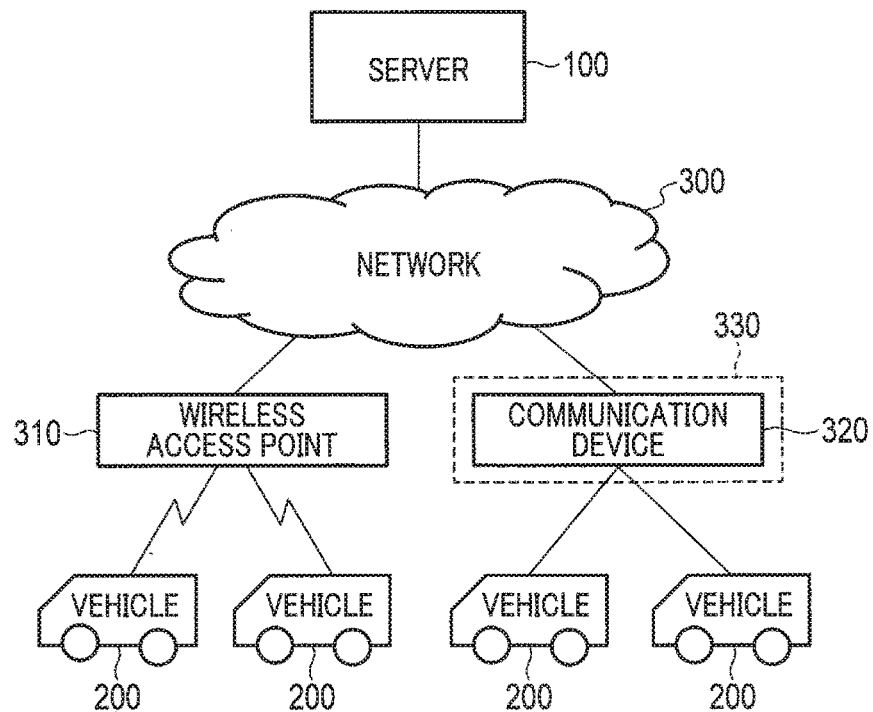
FIG. 1 is a block diagram for explaining a configuration of a system according to an embodiment.

FIG. 1 is a block diagram illustrating a configuration of a system according to the present embodiment. As shown in FIG. 1, the system of the present embodiment is configured to include a server 100, a vehicle 200 mounted with a controller (described later) as an embedded system, and a wide area network 300.

A wireless access point 310 and a communication device 320 installed in a maintenance factory 330 are connected to the network 300 by wires. The maintenance factory 330 is, for example, a facility for performing the maintenance of the vehicle 200, and enables the connection between the controller of the vehicle 200 and the network 300 via the communication device 320. In addition, the controller of the vehicle 200 can be connected to the network 300 by wireless communication with the wireless access point 310.

The controller of the vehicle 200 includes a communication function of communicating with the server 100 via the wireless access point 310 and the network 300 when the vehicle 200 is traveling on a public road or the like. In addition, the controller of the vehicle 200 includes a communication function of communicating with the server 100 via the communication device 320 and the network 300 when the vehicle 200 pulls up at the maintenance factory 330.

The server 100 is, for example, a computer that is operated by a finished automobile manufacturer of the vehicle 200, and manages each vehicle 200. The server 100 has a function (described later) of determining whether to debug the microcomputer of the controller mounted on the vehicle 200 according to the present embodiment.

Figure 19:
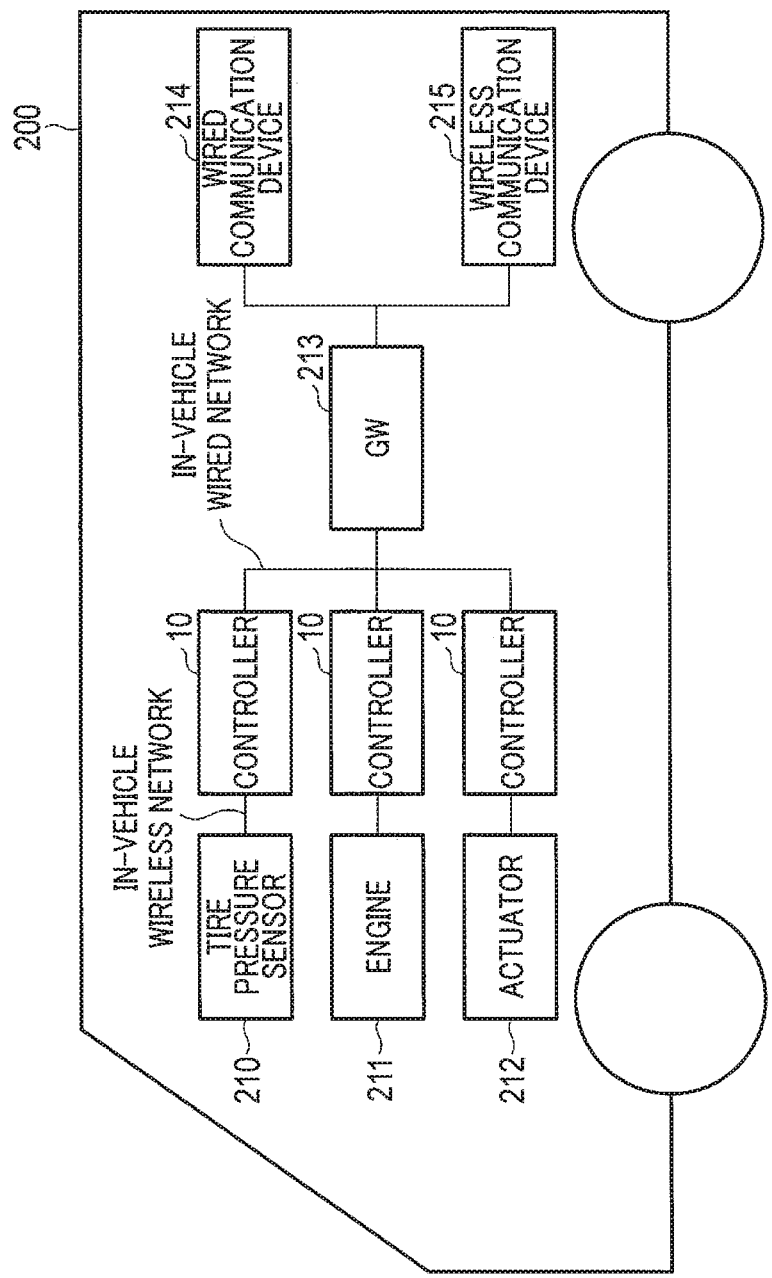
FIG. 19 is a diagram illustrating an in-vehicle network of a vehicle according to an embodiment.

FIG. 19 is a diagram illustrating the in-vehicle network of the vehicle 200. As shown in FIG. 19, a plurality of controllers 10 are connected to the in-vehicle network, and each of the controllers 10 controls the devices of the vehicle. For example, the controller 10 is connected to a tire pressure sensor 210 via an in-vehicle wireless network. Furthermore, for example, the controller 10 controls the devices such as an engine 211, an actuator 212, or an air conditioner via an in-vehicle wired network. In addition, each of the controllers 10 is connected to a wired communication device 214 and a wireless communication device 215 via a gateway (GW) 213. Therefore, each of the controllers 10 can communicate with devices outside the vehicle as necessary.

[Configuration of Controller]

Figure 2:
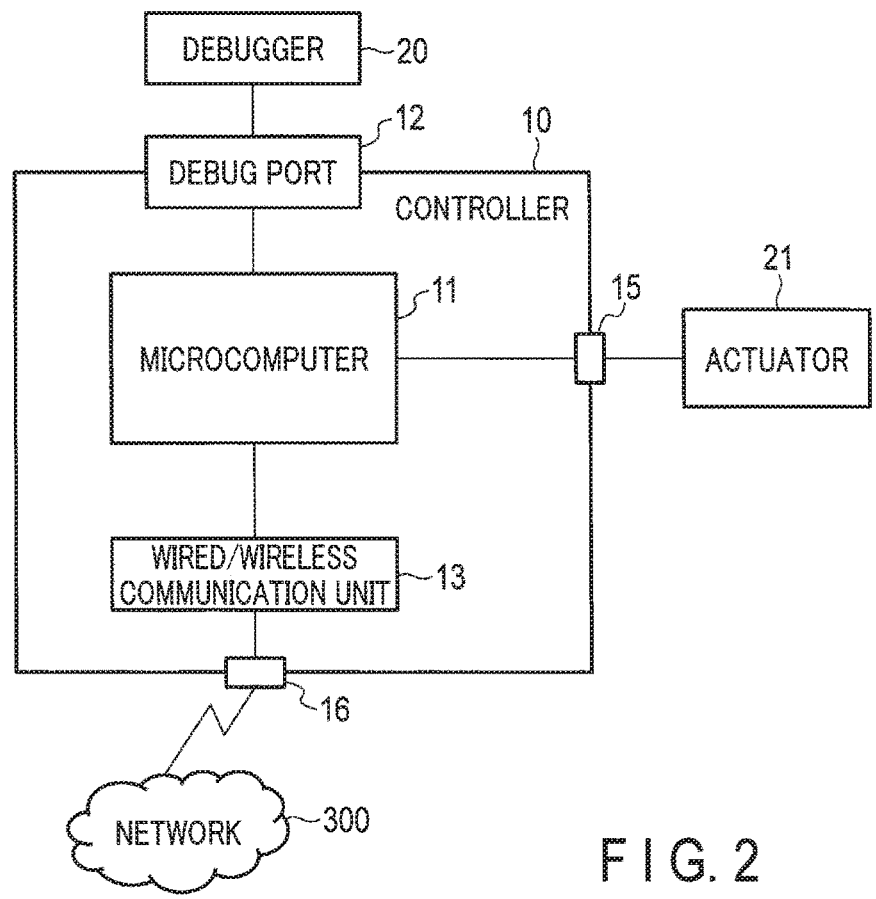
FIG. 2 is a block diagram for explaining a configuration of a controller according to an embodiment.

FIG. 2 is a block diagram illustrating a configuration of a controller 10 that controls, for example, an actuator 21 as the embedded system mounted in the vehicle 200.

As shown in FIG. 2, the controller 10 includes a microcomputer 11 as a main part, a debug port 12, and a wired/wireless communication unit 13. The microcomputer 11 connects to the actuator 21 via an input/output interface 15, and drives and controls the actuator 21. In addition, the microcomputer 11 controls an engine speed, a brake operation, and the like.

The microcomputer 11 can connect to an external debugger 20 via the debug port 12. The present embodiment relates to a debug access restriction function of restricting illegal debug of software of the microcomputer 11 via the debug port 12 as described later.

Here, when there is no debug access restriction function of the present embodiment, the debugger 20 can unconditionally switch the microcomputer 11 to a debug mode through the debug port 12. The microcomputer 11 in the debug mode can provide the debugger 20 with an environment suitable for analyzing the software under operation. For example, it is possible to read a register value of the microcomputer 11 or a variety of information of a memory or the like, it is possible to temporarily stop the execution of the software, and it is also possible to rewrite a program.

The microcomputer 11 can wirelessly connect to the network 300 via the wired/wireless communication unit 13 and a communication interface 16. Therefore, the microcomputer 11 can exchange a variety of information with the server 100 via the network 300 as described later.

[Configuration of Microcomputer]

Figure 3:
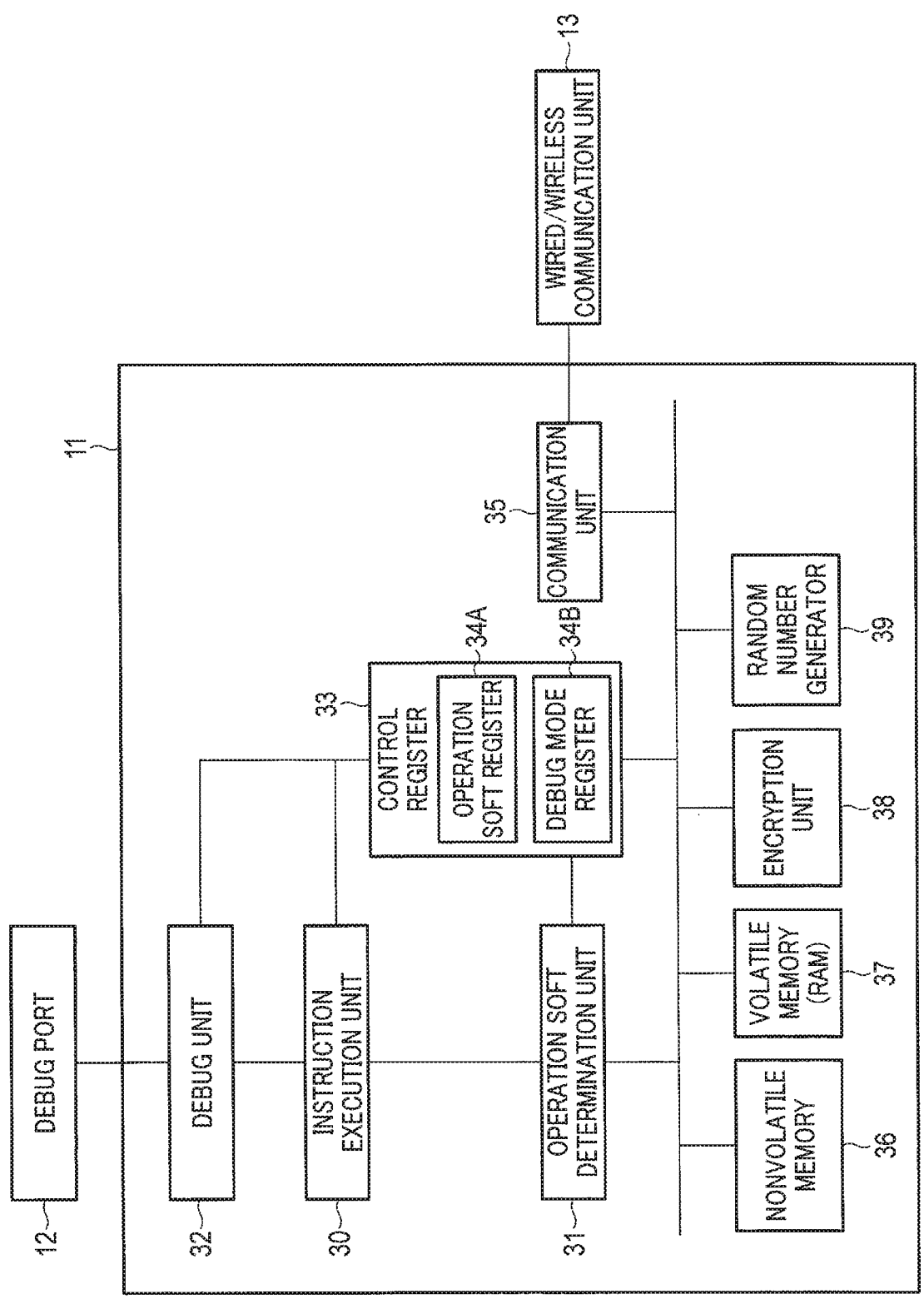
FIG. 3 is a block diagram for explaining an internal configuration of a microcomputer according to an embodiment.

FIG. 3 is a block diagram illustrating the internal configuration of the microcomputer 11. As shown in FIG. 3, the microcomputer 11 includes an instruction execution unit 30, an operation soft determination unit 31, a debug unit 32, a control register 33, and a communication unit 35.

The instruction execution unit 30 is a unit that executes an instruction group included in a variety of software stored in a nonvolatile memory 36 described later. The instruction execution unit 30 executes various controls of internal hardware via the operation soft determination unit 31 and the control register 33. For example, the instruction execution unit 30 can reset the entire microcomputer 11 by writing to a register managing an output of a reset signal via the control register 33.

In addition, the instruction execution unit 30 executes the control of the communication unit 35, the nonvolatile memory 36, a volatile memory (for example, a random access memory (RAM)) 37, an encryption unit 38, and a random number generator 39 via the control register 33. The nonvolatile memory 36 and the volatile memory 37 are connected to an internal bus, that is, a so-called on-chip memory configuration.

The operation soft determination unit 31 determines the type of the software in execution, so as to restrict reading and writing of a partial area of the nonvolatile memory 36 and the volatile memory 37 by the instruction execution unit 30 and prohibit writing to a debug mode register 34B. At this time, the operation soft determination unit 31 determines the type of the operation soft by an operation soft register 34A in the control register 33. The operation soft determination unit 31 does not execute restriction when the value of the operation soft register 34A is 0, and performs restriction when the value is other than 0.

The control register 33 includes the operation soft register 34A and the debug mode register 34B to which writing is restricted.

The operation soft register 34A is necessarily cleared to 0 at the time of turning on or resetting the terminal, and then writes a value only once. Once the value is written, the value cannot be changed until the terminal is reset again. Due to these characteristics, the nonvolatile memory 36, the volatile memory 37, and the debug mode register 34B can be read and written without restriction while the ROM monitor (described later) operating immediately after the reset is operating. On the other hand, when the ROM monitor changes the register value to a value other than 0, reading and writing to a partial area of the nonvolatile memory 36 and the volatile memory 37 are restricted, and writing to the debug mode register 34B is prohibited. The operation soft register 34A is written immediately before the ROM monitor transfers control to other software.

The debug unit 32 is connected to the debug port 12 outside the instruction execution unit 30 and the microcomputer 11. When the debug mode (debug function) is effective, the debug unit 32 operates the instruction execution unit 30 according to the instruction of the external debugger 20 (see FIG. 2). The switching of enabling or disabling the debug mode is performed by using the debug mode register 34B in the control register 33.

The encryption unit 38 is a dedicated unit that efficiently executes a block encryption process that takes time in the software process. An encryption method is, for example, 3 Data Encryption Standard (DES) or Advanced Encryption Standard (AES). In addition, the random number generator 39 is a dedicated unit that executes generation of a random number that is difficult to implement by software.

The communication unit 35 is connected to the wired/wireless communication unit 13 outside the microcomputer 11, and performs information communication by a protocol widely used in the in-vehicle network such as Universal Synchronous Receiver-Transmitter (UART) or Controller Area Network (CAN).

[Internal Configuration of Nonvolatile Memory]

Figure 4:
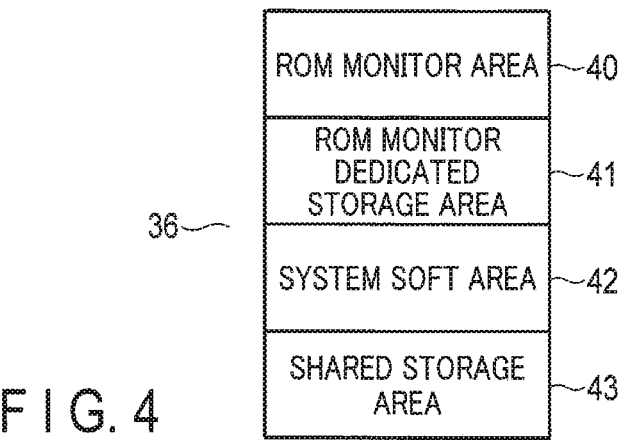
FIG. 4 is a diagram illustrating an internal configuration of a nonvolatile memory according to an embodiment.

FIG. 4 is a diagram illustrating the internal configuration (memory map) of the nonvolatile memory 36. As shown in FIG. 4, the nonvolatile memory 36 includes a ROM monitor area 40 that is a storage area storing the ROM monitor that is software, and a system soft area 42 that is a storage area storing system software (referred to as system soft).

As described later, the ROM monitor is software that executes only an important process for security related to the access restriction of the debug according to the present embodiment. The system soft is software that executes a general process according to the purpose of use of the microcomputer 11.

In principle, the ROM monitor area 40 is an area that is not assumed to be rewritten, and is arranged in a rewrite prohibition area of the nonvolatile memory 36. The system soft area 42 is arranged in a rewritable area, and in principle, the system soft area 42 is rewritten only at the time of updating the system soft.

Furthermore, the nonvolatile memory 36 includes a ROM monitor dedicated storage area 41 and a shared storage area 43 for storing information used by each software.

Figure 5:
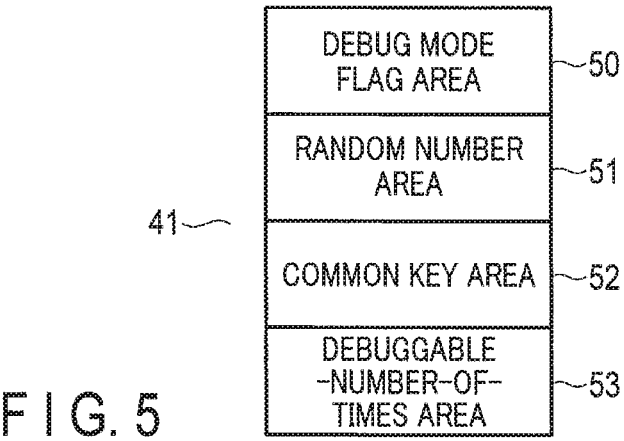
FIG. 5 is a diagram illustrating an internal configuration of a dedicated storage area of a ROM monitor according to an embodiment.

FIG. 5 is a diagram illustrating the internal configuration of the ROM monitor dedicated storage area 41. The ROM monitor dedicated storage area 41 is an area that only the ROM monitor can read and write. Therefore, the ROM monitor dedicated storage area 41 is an area that the system soft cannot read and write.

As shown in FIG. 5, the ROM monitor dedicated storage area 41 includes a debug mode flag area 50 in which a debug mode flag is stored, and a random number area 51 in which a random number is stored. In addition, the ROM monitor dedicated storage area 41 includes a common key area 52 in which a common key is stored, and a debuggable-number-of-times area 53 in which a debuggable number of times is stored.

The debug mode flag is a flag indicating whether the debug mode (debug function) is effective or ineffective. The random number of the random number area 51 is a random number used when communicating with the server 100 for countermeasures against replay attacks. The common key of the common key area 52 is a common key held by the microcomputer 11 and the server 100. It is assumed that different keys are assigned to individual microcomputers and the association with the server 100 is completed before shipment. The debuggable number of times is the remaining number of times that the debug can be executed on the microcomputer 11.

Figure 6:
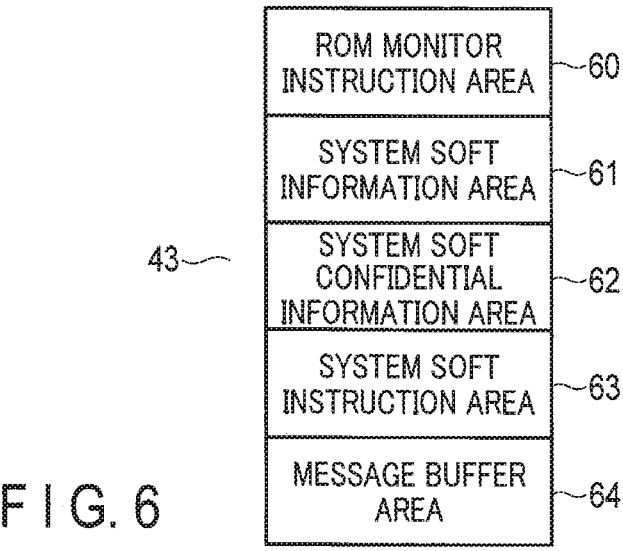
FIG. 6 is a diagram illustrating an internal configuration of a shared storage area according to an embodiment.

FIG. 6 is a diagram illustrating the internal configuration of the shared storage area 43. The shared storage area 43 is an area that both the ROM monitor and the system soft can read and write. Each software stores information used by each software in the shared storage area 43 and also stores instructions or information to be transmitted to the other software across the reset of the microcomputer 11.

As shown in FIG. 6, the shared storage area 43 includes each storage area of a ROM monitor instruction area 60, a system soft information area 61, a system soft confidential information area 62, a system soft instruction area 63, and a debug message buffer area (referred to as a message buffer area) 64.

The ROM monitor instruction area 60 is an area for writing an instruction from the system soft to the ROM monitor. In the present embodiment, two types of instructions, an instruction (sys-boot) for normally booting system soft and an instruction (make-req) for creating a debug permission request message, are defined as specific instructions. These instructions are not machine language instructions directly interpreted by the instruction execution unit 30 but instructions for the ROM monitor and the system soft.

The system soft information area 61 is an area in which arbitrary information collected by the system soft is stored. The system soft confidential information area 62 is an area in which confidential information used by system soft is stored. The system soft instruction area 63 is an area for writing an instruction from the ROM monitor to the system soft. In the present embodiment, two types of instructions, an instruction (normal) that causes the system soft to perform only a normal process and an instruction (send-req) that causes the server 100 to send a debug permission request message, are defined as specific instructions. The message buffer area 64 is an area in which various messages to be exchanged with the server 100 are stored.

[Configuration of ROM Monitor and Debug Mode Register]

Returning to FIG. 3, the configuration of the ROM monitor and the debug mode register 34B of the present embodiment will be described.

As described above, the ROM monitor dedicated storage area 41 of the nonvolatile memory 36 is an area that only the ROM monitor can read and write while the ROM monitor is running. On the other hand, the writing to the debug mode register 34B included in the control register 33 is also restricted to the time of execution of the ROM monitor.

As these execution units, the operation soft determination unit 31 is involved. When the instruction execution unit 30 executes the instruction, the operation soft determination unit 31 monitors whether the access destination (operand) by the instruction execution is the ROM monitor, the ROM monitor dedicated storage area 41 and the debug mode register 34B, or an area other than that. Since the operation soft determination unit 31 also determines the type of the software being executed, the instruction is executed without restriction of the operand only in the case of the instruction of the ROM monitor. In other words, only when the ROM monitor is executed, the ROM monitor dedicated storage area 41 and the debug mode register 34B can be rewritten. In the present embodiment, the ROM monitor dedicated storage area 41 is set in the nonvolatile memory 36, but a part of the volatile memory 37 may be used as the ROM monitor dedicated storage area 41.

The ROM monitor has only two entry points, that is, reset and non-maskable interrupt (NMI). The ROM monitor cannot be executed from addresses other than these two entry points. That is, the ROM monitor is executed only at the reset or the NMI.

[Relationship Between Controller of Vehicle and Server]

Figure 7:
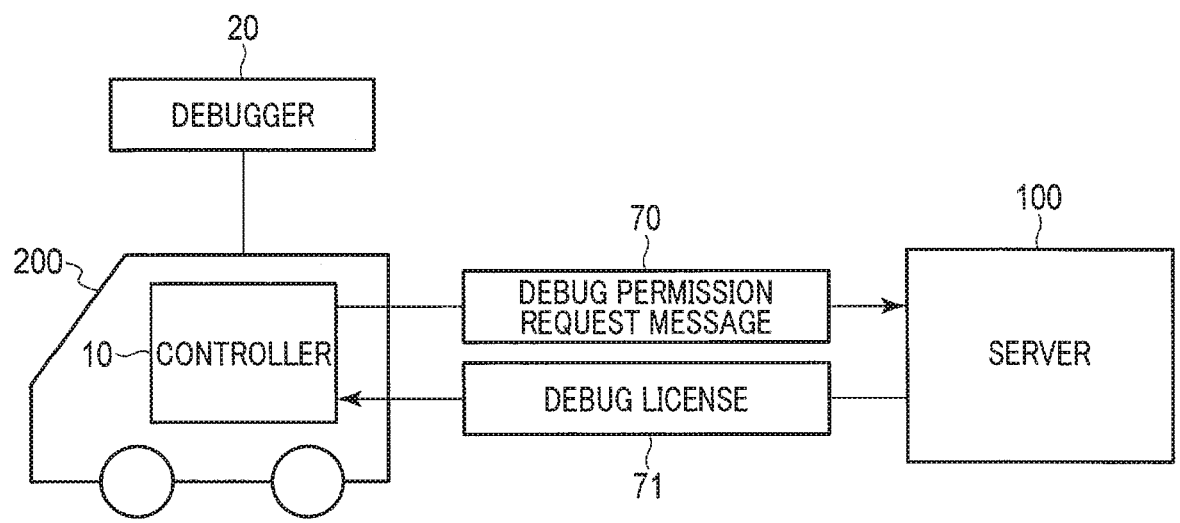
FIG. 7 is a diagram illustrating a relationship between a controller and a server according to an embodiment.

FIG. 7 is a diagram illustrating a relationship between the controller 10 of the vehicle 200 and the server 100 in relation to debug. As described above, in the present embodiment, the controller 10 of the vehicle 200 and the server 100 are connected to each other via the network 300 and can exchange information with each other.

As shown in FIG. 7, when the software in the microcomputer 11 included in the controller 10 of the vehicle 200 is debugged, the debugger 20 is externally connected to the debug port 12. In the present embodiment, the microcomputer 11 inquires of the server 100 as to whether the debug mode can be entered with respect to debug access from the debugger 20.

Based on the information received from the controller 10 of the vehicle 200, the server 100 determines whether the debug is possible and returns the determination result. The microcomputer 11 executes the switching to the debug mode based on the determination result from the server 100. Alternatively, the microcomputer 11 refuses to switch to the debug mode and executes the process of separating the debug access from the debugger 20.

As shown in FIG. 7, from the viewpoint of mounting, the controller 10 of the vehicle 200 sends a debug permission request message 70 to the server 100 via the network 300. When the debug is possible, the server 100 returns a debug license 71 to the controller 10 in response to the debug permission request message 70. The microcomputer 11 determines that the debug permission has been given by the debug license 71.

That is, in the present embodiment, debug permission authority to the server 100 side is separated so that not the microcomputer 11 side but the server 100 determines whether the debug is possible with respect to the debug access from the debugger 20. Therefore, for example, the finished automobile manufacturer of the vehicle 200, which operates the server 100, can grasp the debug situation of each vehicle 200.

However, in the mechanism of the present embodiment, it is obvious that the microcomputer 11 of the vehicle 200 has to comply with the determination of the server 100 side. As a specific example, when the system soft of the microcomputer 11 is in an abnormal state due to a malicious attack, the system soft may ignore the determination of the server 100 side. Then, no matter how correctly the server 100 determines, the microcomputer 11 side may ignore the fact and permit malicious debug.

In order to avoid such a situation, it is necessary to prepare a mechanism for compliance with the determination of the server 100 side in the microcomputer 11 side. In other words, it is necessary to prepare a mechanism that satisfies the two points that the microcomputer 11 side needs to transmit correct information to the server 100 side without being affected by malicious attack and always execute based on the determination result of the server 100 side.

[Functions of ROM Monitor and System Soft]

Figure 8:
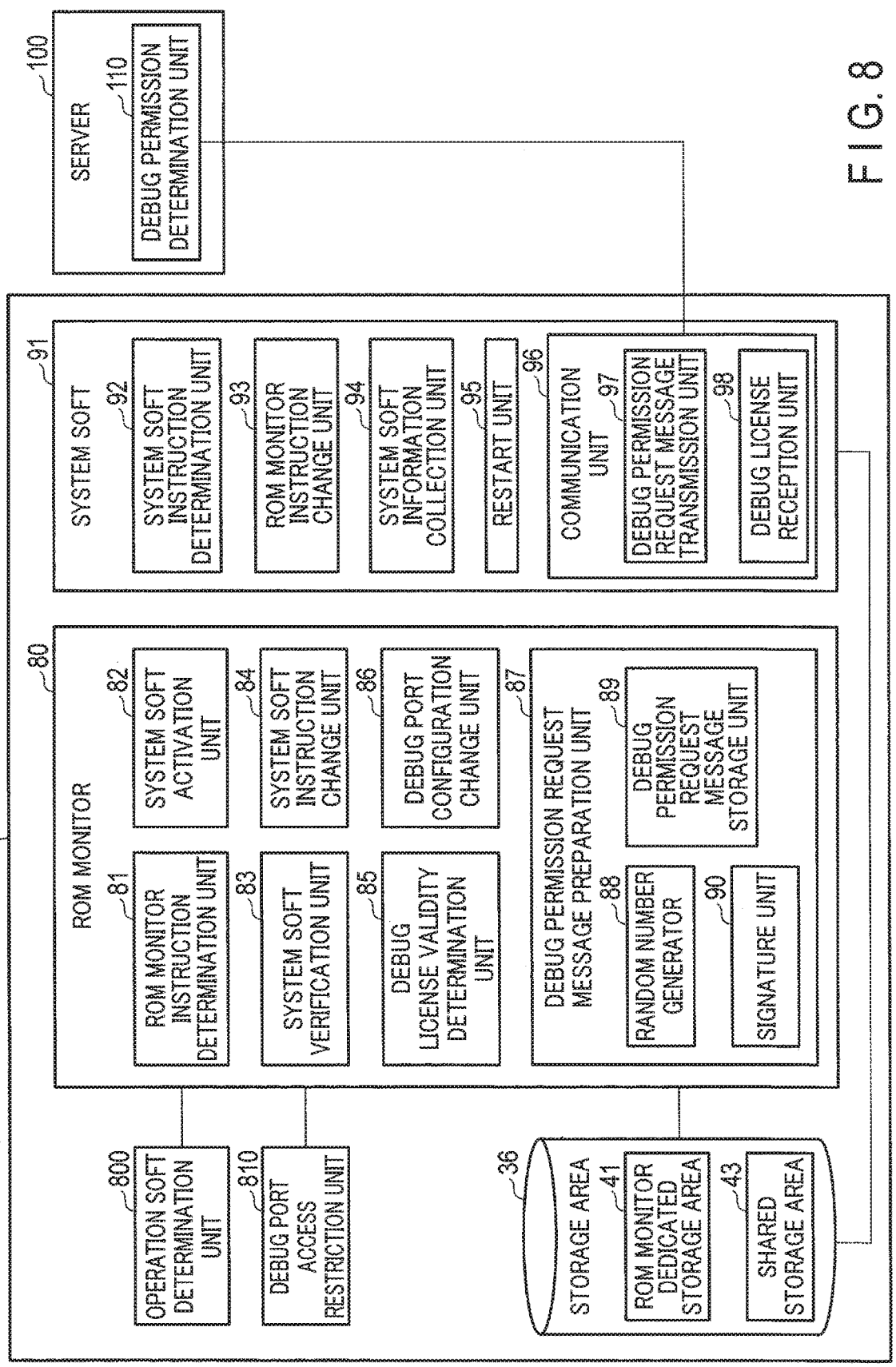
FIG. 8 is a block diagram for explaining functions of a ROM monitor and system soft according to an embodiment.

FIG. 8 is a block diagram for explaining the functions of the ROM monitor and the system soft. As shown in FIG. 8, the microcomputer 11 has a ROM monitor 80 and system soft 91 as software that provides main functions.

The ROM monitor 80 and the system soft 91 are respectively stored in the ROM monitor area 40 and the system soft area 42 of the nonvolatile memory 36 as described above. The nonvolatile memory 36 includes a ROM monitor dedicated storage area 41 and a shared storage area 43 as storage areas related to each software. The ROM monitor dedicated storage area 41 is an area that only the ROM monitor 80 can read and write. The shared storage area 43 is an area that both the ROM monitor 80 and the system soft 91 can read and write.

As described above, the ROM monitor 80 includes each software function unit of a ROM monitor instruction determination unit 81, a system soft activation unit 82, a system soft verification unit 83, and a system soft instruction change unit 84. In addition, the ROM monitor 80 includes each software function unit of a debug license validity determination unit 85, a debug port configuration change unit 86, and a debug permission request message preparation unit 87.

The debug permission request message preparation unit 87 includes each software function unit of a random number generator 88, a debug permission request message storage unit 89, and a signature unit 90. The ROM monitor 80 does not include a communication unit.

As described later, the system soft 91 includes each software function unit of a system soft instruction determination unit 92, a ROM monitor instruction change unit 93, a system soft information collection unit 94, a restart unit 95, and a communication unit 96. The communication unit 96 includes each software function units of a debug permission request message transmission unit 97 and a debug license reception unit 98.

Furthermore, the microcomputer 11 includes an operation soft determination unit 800 and a debug port access restriction unit 810 as functions that are mainly realized by hardware. These hardware function units may be collectively referred to as HW 820.

The operation soft determination unit 800 determines whether the software being executed is the ROM monitor 80 or the system soft 91. The operation soft determination unit 800 is a component including the operation soft determination unit 31, and is implemented by hardware. Therefore, even if the software is in a malicious state, it will not be affected. Therefore, it is possible to prevent software other than the ROM monitor 80 from rewriting the ROM monitor dedicated storage area 41 and the debug mode register 34B.

The debug port access restriction unit 810 actually executes the access (debug access) restriction when the external debugger 20 is connected to the debug port 12. The debug port access restriction unit 810 permits communication (debug access) with the connected debugger 20 when the debug mode is effective, that is, only when the valid flag is set in the debug mode register 34 of the control register 33. When the debug mode is ineffective, the debug port access restriction unit 810 blocks communication with the debugger 20 and refuse the debug access.

Here, as described above, the server 100 is a computer different from the microcomputer 11 and includes a software function unit that is a debug permission determination unit 110. The debug permission determination unit 110 examines the contents of the debug permission request message sent from the microcomputer 11, and sends back a debug license to the microcomputer 11 if there is no problem.

Operation of Present Embodiment

Figure 9:
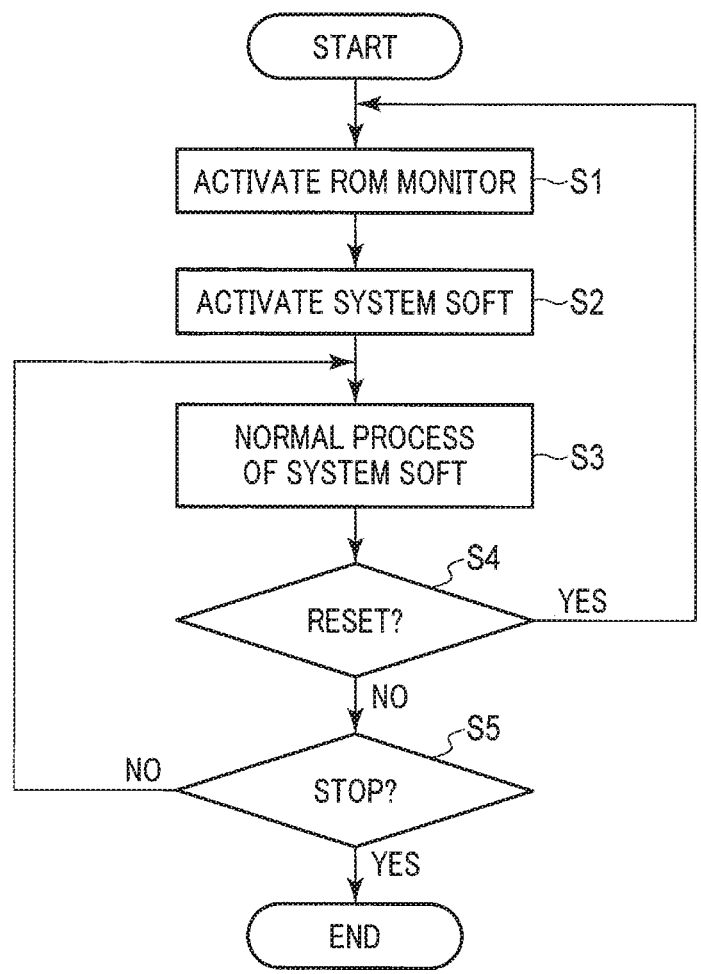
FIG. 9 is a flowchart for explaining a basic process of a microcomputer according to an embodiment.
Figure 10:
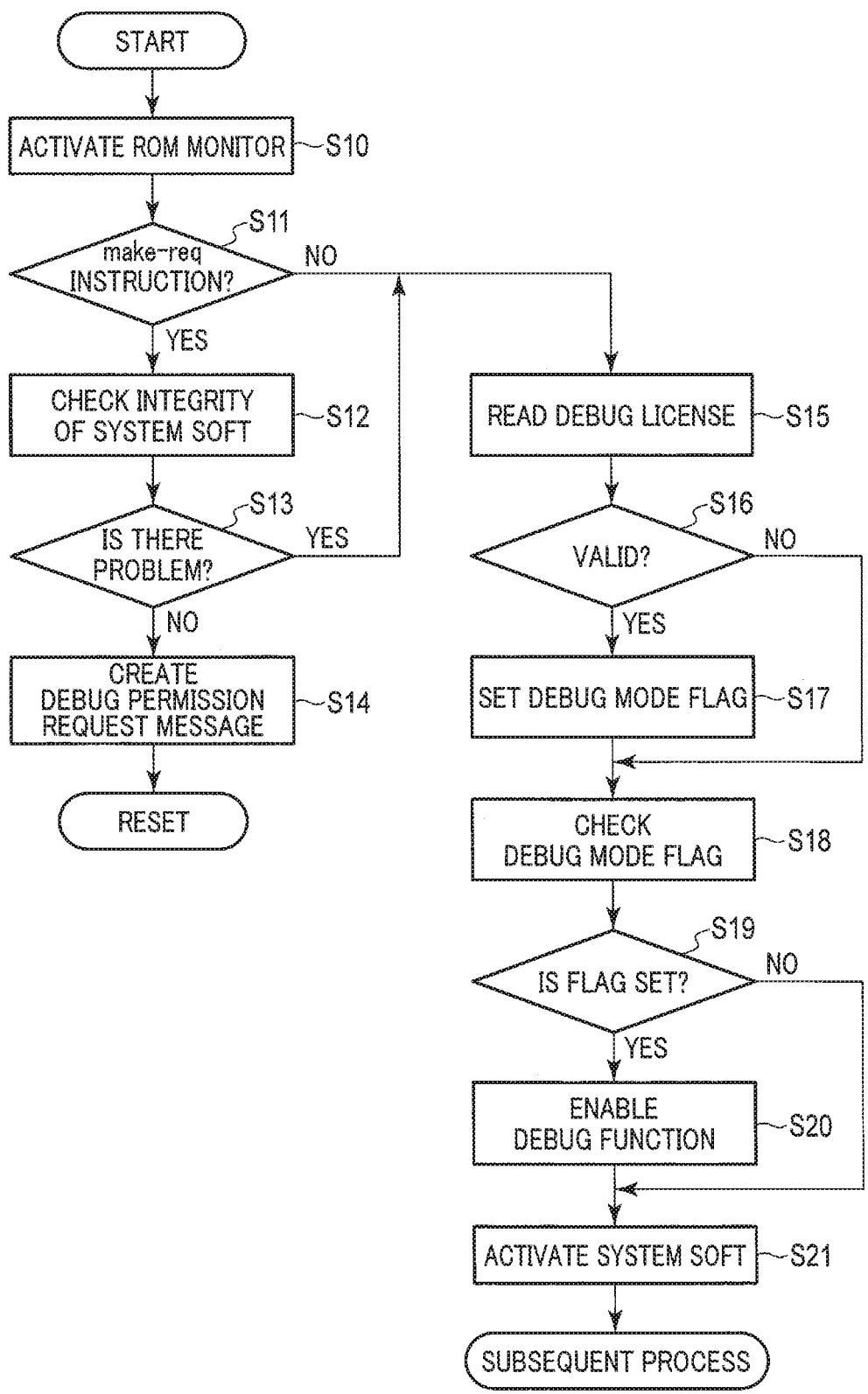
FIG. 10 is a flowchart for explaining a process of a ROM monitor according to an embodiment.

Hereinafter, the operation of the present embodiment will be described with reference to FIGS. 9 to 18. FIG. 9 is a flowchart for explaining the basic process of the microcomputer. FIG. 10 is a flowchart for explaining the process of the ROM monitor. FIG. 11 is a diagram illustrating the configuration of the debug permission request message. FIG. 12 is a flowchart for explaining the process of the system soft. FIG. 13 is a flowchart for explaining the debug possibility process. FIGS. 14 to 18 are sequence diagrams for explaining the cooperation of the HW 820, the ROM monitor 80, the system soft 91, and the server 100.

[Basic Process of Microcomputer]

As shown in FIG. 9, when power is supplied to the microcomputer 11 from the controller 10, the ROM monitor 80 is activated (S1). Here, the ROM monitor 80 executes a security-related process for realizing the debug access restriction function of the present embodiment. The debug access restriction function is a function that can execute effective access restriction for an illegal debug access by the debugger 20, for example. It is assumed that the ROM monitor 80 has no software bug and software vulnerability.

The ROM monitor 80 rewrites the value of the operation soft register 34A to a value other than 0, and then activates the system soft 91 (S2). As described above, the system soft 91 executes a normal process corresponding to the purpose of use of the microcomputer 11 (S3). The normal process is, for example, a control process of an engine or an air conditioner of the vehicle 200. The system soft 91 continues the normal process until the power is turned off (NO in S4, NO in S5).

Here, when the reset is applied by software through the control register 33, a process transition from the system soft 91 to the ROM monitor 80 occurs (YES in S4). The reset occurs at various timings, for example, during the execution of the ROM monitor 80 or before the normal process of the system soft 91 is started. In addition to the reset, the process transition also occurs when the power to the microcomputer 11 is turned on and off again.

[Process of ROM Monitor]

As shown in FIG. 10, after the activation, the ROM monitor 80 roughly performs two security-related processes (debug access restriction function) in addition to the activation process of the system soft 91. The first security-related process is a process of creating a debug permission request message (S14). The second security-related process is the enabling of the debug function (S20). Each process will be specifically described below.

After the activation (S10), when the ROM monitor instruction determination unit 81 determines that an instruction (make-req) is written from the system soft 91 in the ROM monitor instruction area 60 included in the shared storage area 43, the ROM monitor 80 starts the process of creating the debug permission request message (YES in S11). Specifically, the ROM monitor 80 checks the state of the system soft 91 from the viewpoint of integrity (S12). The check of the integrity is a process of confirming that the entire system soft on the nonvolatile memory 36 has not been falsified. As the confirming method, verification may be performed by a hash value and a public key at this timing, and the integrity of the system soft that has issued the instruction based on the previous verification process is believed as correct (see, for example, Jpn. Pat. Appln. KOKAI Publication No. 2017-156945). When there is no problem in the state of the system soft 91 (NO in S13), the ROM monitor 80 creates the debug permission request message (S14), and stores the debug permission request message in the message buffer area 64 of the shared storage area 43.

After that, when the ROM monitor instruction area 60 is rewritten to an instruction (sys-boot) by the ROM monitor instruction change unit 93 of the system soft 91, the microcomputer 11 resets through the control register 33 in a software manner. The instruction (sys-boot) is an instruction to normally boot the system soft 91. After that, when the ROM monitor 80 is activated next time, the process of creating the debug permission request message is skipped, and the process for activating the system soft 91 is executed (NO in S11).

FIG. 11 is a diagram illustrating the configuration of the debug permission request message. The ROM monitor 80 stores the debug permission request message in the debug permission request message storage unit 89 by the debug permission request message preparation unit 87.

As shown in FIG. 11, the ROM monitor 80 writes an instruction (req-debug) meaning a debug permission request to the server 100. Next, the ROM monitor 80 writes a random number generated by the random number generator 88. The random number is stored in the random number area 51 of the ROM monitor dedicated storage area 41.

Furthermore, the ROM monitor 80 copies the system soft information previously prepared by the system soft 91 from the system soft information area 61 of the shared storage area 43. The system soft information includes a system soft name, a version of the system soft 91, and extension information. The extension information is information prepared to transmit complicated information other than the system soft name or the version to the server 100 side.

In order to maintain the simple configuration, the ROM monitor 80 is not assumed to be updated for the purpose of adding functions. On the other hand, the system soft 91 or the server 100 is updated according to a situation. In general, it is considered that additional information is needed for determining whether the debug is possible, according to the operation situation. Such information is collected by the system soft 91 as the extension information. Therefore, it is possible to perform system expansion in the future.

Finally, the ROM monitor 80 executes an electronic signature for the entire debug permission request message by using the common key shared with the server 100 by the signature unit 90. The common key is stored in the common key area 52 of the ROM monitor dedicated storage area 41.

Returning to FIG. 10, when no instruction (make-req) is written in the ROM monitor instruction area 60 (NO in S11) or when the state of the system soft 91 is illegal (YES in S13), the ROM monitor 80 does not execute the process of creating the debug permission request message.

That the state of the system soft is illegal is a case where the system soft area 42 is falsified and the integrity is not maintained. There is a high possibility that the falsified system soft 91 will perform an illegal operation, and the debug permission request itself is not reliable. Therefore, the ROM monitor 80 ignores the debug permission request. On the other hand, when the system soft 91 is normal, information collected by the same soft is also reliable. That is, it can be estimated that false information having malicious intent will not be mixed into each information of the system soft name, the version, and the extension information included in the debug permission request message.

When the instruction (make-req) has not been written in the ROM monitor instruction area 60 (NO in S11), the ROM monitor 80 executes the process of enabling the debug function that is the second security-related process. Here, the enabling of the debug function is to set the microcomputer 11 to the debug mode, so that the system soft 91 can be operated from the debugger 20 connected to the debug port 12.

Specifically, the ROM monitor 80 confirms whether the debug license received from the server 100 is stored in the message buffer area 64 included in the shared storage area 43, and when stored, the ROM monitor 80 reads the debug license (S15). The debug license validity determination unit 85 of the ROM monitor 80 verifies the validity of whether the falsification or the like is performed (S16).

When the verification of the validity is successful (YES in S16), the ROM monitor 80 sets the debug mode flag to the debug mode flag area 50 of the ROM monitor dedicated storage area 41 (S17). Here, the set debug mode flag is a valid flag (1) indicating the validity of the debug mode (debug function). The ROM monitor 80 erases the verified debug license from the message buffer area 64.

Next, the ROM monitor 80 checks the debug mode flag of the debug mode flag area 50 (S18). When the valid flag is set (YES in S19), the ROM monitor 80 enables the debug function (S20). More specifically, the microcomputer 11 enables the debug mode by operating the debug mode register 34B of the control register 33. At this time, since the ROM monitor 80 is in operation, the rewriting to the debug mode register 34B is possible. After that, the ROM monitor 80 activates the system soft 91 (S21).

The ROM monitor 80 can perform the process of verifying the debug license every time without referring to the debug mode flag. However, since the constraint of the activation time of the microcomputer 11 is severe, the verification time may not be ensured in some cases. Therefore, once the debug license is verified, it is desirable to perform control based on the debug mode flag with writing restriction.

Here, in the verification of the debug license, three items are confirmed: (1) the debug license is not falsified, (2) the debug license is issued from the supposed correct management server, and (3) the debug license is not reused. The item (3) is a countermeasure against an attack that is well known as "replay attack". The replay attack is an attack that gives some adverse effect by reusing previously transmitted and received data as it is. In the absence of the replay attack countermeasure, there is a possibility that the previously issued debug license will be diverted and the debug (debug access) that should be refused by the microcomputer 11 side will be permitted. Whether to debug should be determined in consideration of the state of the latest microcomputer 11, and it is necessary to avoid the diversion of the previously issued debug license.

[Process of System Soft]

As shown in FIG. 12, after the activation, the system soft 91 executes the debug permission request process other than the normal process. The debug permission request message is a message for obtaining the debug license from the server 100 (see FIG. 11). This will be described in detail below.

After the activation (S30), when the system soft instruction determination unit 92 confirms that the instruction (send-req) is stored in the system soft instruction area 63 of the shared storage area 43 (YES in S31), the system soft 91 executes the debug permission request process other than the normal process.

Specifically, the system soft 91 reads the debug permission request message stored in the message buffer area 64 of the shared storage area 43 (S32). The debug permission request message transmission unit 97 of the communication unit 96 of the system soft 91 sends the debug permission request message to the server 100 (S33).

As described later, the debug permission determination unit 110 of the server 100 confirms the validity or contents of the debug permission request message. The server 100 returns the debug license to the system soft 91 when the debug is permitted.

When the debug license is returned from the server 100, the system soft 91 receives the debug license by the debug license reception unit 98 of the communication unit 96 (YES in S34), and stores the debug license in the message buffer area 64 of the shared storage area 43 (S35).

The system soft 91 rewrites the instruction (normal) with respect to the system soft instruction area 63 of the shared storage area 43 and executes the reset. Therefore, when activated after the reset, the system soft 91 executes the normal process as described above (S36) in response to the instruction (normal) of the system soft instruction area 63 (NO in S31). The system soft 91 continues the normal process until the system soft 91 is reset (NO in S37).

As described above, in the present embodiment, the system soft 91 is configured to send the debug permission request message created by the ROM monitor 80 to the server 100 on the so-called proxy basis by the communication unit 96. Therefore, the ROM monitor 80 can maintain a relatively small and simple software structure without adding a communication function. Generally, communication codes are complicated since the communication codes handle variable length fields. Therefore, vulnerability of software is often caused. In the present embodiment, the ROM monitor 80 can be integrated into the process of creating the debug permission request message and the process of verifying the debug license, thereby eliminating the vulnerability.

On the other hand, since the system soft 91 performs a communication process, the probability of including the vulnerability increases. However, even when the system soft 91 is vulnerable, it will not have a big influence on the debug restriction function. The reason is that the system soft 91 merely mediates information exchange between the ROM monitor 80 and the server 100 and does not involve an important determination process related to the debug (debug access) restriction. As described above, the ROM monitor 80 determines switching to the debug mode. The ROM monitor 80 makes determination based on the debug license issued by the server 100. In addition, when the contents of the debug permission request message are rewritten maliciously by the illegally falsified system soft 91, the falsification can be detected by the server 100 or the ROM monitor 80.

[Debug Possibility Process]

FIG. 13 is associated with FIG. 7 and is a flowchart illustrating the debug access restriction process of the microcomputer 11. As shown in FIG. 13, when the debugger 20 is externally connected to the debug port 12 (S40), the microcomputer 11 inquires of the server 100 about whether it is possible to enter the debug mode in response to the debug access from the debugger 20 (S41). That is, the microcomputer 11 sends the debug permission request message and requests the server 100 to determine whether the debug is possible (debug access).

The microcomputer 11 receives the determination result transmitted from the server 100 (S42). When the debug license is received as the determination result (YES in S43), the microcomputer 11 enables the debug function (debug mode) (S44). Therefore, the microcomputer 11 permits the execution of debug on the system soft 91 in response to the debug access from the debugger 20 (S45).

On the other hand, when the microcomputer 11 receives the debug impossibility as the determination result (NO of S43), the microcomputer 11 disables the debug function (debug mode) (S46). Therefore, the microcomputer 11 detaches the debug access from the debugger 20 and refuses to execute the debug on the system soft 91 (S47).

[Cooperation of System]

Hereinafter, the operation of the present embodiment will be described from the viewpoint of cooperation of the HW (hardware function) 820, the ROM monitor 80, the system soft 91, and the server 100 with reference to the sequence diagrams illustrated in FIGS. 14 to 18.

As described above, the HW 820 means the function realized mainly by the hardware of the microcomputer 11, and also includes software functions such as the operation soft determination unit 800 and the debug port access restriction unit 810. The HW 820 further includes functions such as initialization of the control register 33, control transition to the program in the nonvolatile memory 36, power supply control, and the like.

As common items in FIGS. 14 to 18, in the process by the cooperation between the ROM monitor 80 and the system soft 91, the read or write operation (read or write) of information or instructions to the ROM monitor dedicated storage area 41 or the shared storage area 43 is executed. These operations are specified in the form of "read information or instruction", "write value to area name".

As a specific example, when the ROM monitor 80 reads the ROM monitor instruction from the shared storage area 43, the arrow extends to the shared storage area 43 and is expressed as read "ROM monitor instruction". Similarly, when the system soft 91 writes in the ROM monitor instruction area 60 of the shared storage area 43, the arrow extends to the shared storage area 43 and is expressed as write make-req to "ROM monitor instruction area".

[Normal Process]

Figure 14:
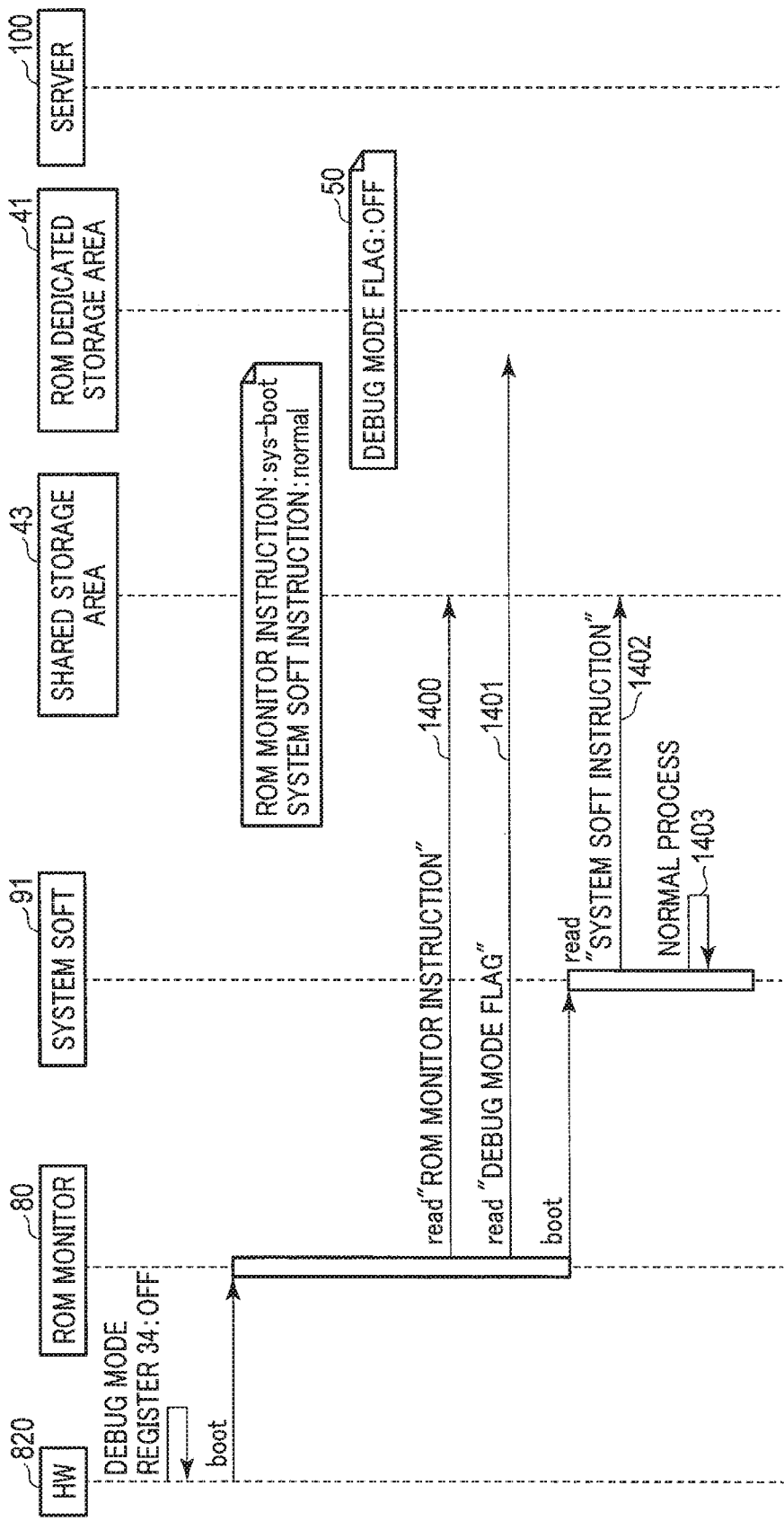
FIG. 14 is a sequence diagram for explaining cooperation of a normal process according to an embodiment.

FIG. 14 is a sequence diagram for explaining the cooperation in the normal processes of the ROM monitor 80 and the system soft 91. In the normal process, the security-related process related to the debug access restriction is not included.

As shown in FIG. 14, in the initial state, the instruction (sys-boot) indicating the activation of the system soft 91 is written in the ROM monitor instruction area 60 of the shared storage area 43. In addition, the instruction (normal) indicating the execution of the normal process is written in the system soft instruction area 63. It is assumed that no significant information has been written in the message buffer area 64 of the shared storage area 43 (a state in which 0 clear or a value indicating that it is not significant is written). In addition, the debug mode flag area 50 of the ROM monitor dedicated storage area 41 is in an OFF state in which the valid flag is not set (simply denoted as OFF). In addition, when the valid flag is set, it is simply denoted as ON.

When power is supplied to the microcomputer 11, the HW 820 and the control register 33 are initialized, and the flag of the debug mode register 34 is set to OFF (disabled). Here, when the flag of the debug mode register 34 is OFF, the debug port access restriction unit 810 refuses communication with the debugger 20 to be connected, and disables the debug access. That is, in the initial state, the microcomputer 11 is in a state in which the debug cannot be executed by the debugger 20.

Next, the HW 820 activates (boot) the ROM monitor 80 and shifts control. The ROM monitor instruction determination unit 81 of the ROM monitor 80 reads the ROM monitor instruction (sys-boot) from the ROM monitor instruction area 60 of the shared storage area 43 (1400). The instruction (sys-boot) is an instruction to activate the system soft 91.

Next, the debug port configuration change unit 86 of the ROM monitor 80 reads the flag from the debug mode flag area 50 of the ROM monitor dedicated storage area 41, and checks whether the debug mode flag is ON or OFF (1401). In this case, since the debug mode flag is OFF, the debug mode register 34 is not operated.

According to the instruction (sys-boot), the ROM monitor 80 activates the system soft 91 by the system soft activation unit 82 and writes the system soft instruction in the system soft instruction area 63 of the shared storage area 43. The system soft instruction determination unit 92 of the system soft 91 checks the instruction (normal) read from the system soft instruction area 63 of the shared storage area 43 (1402).

According to the instruction (normal), the system soft 91 executes the normal process of the microcomputer 11 without executing the security-related process (1403). At this time, since the debug mode flag is OFF, the microcomputer 11 is in a state in which the debug cannot be executed by the debugger 20.

[Debug Permission Request Process]

Figure 15:
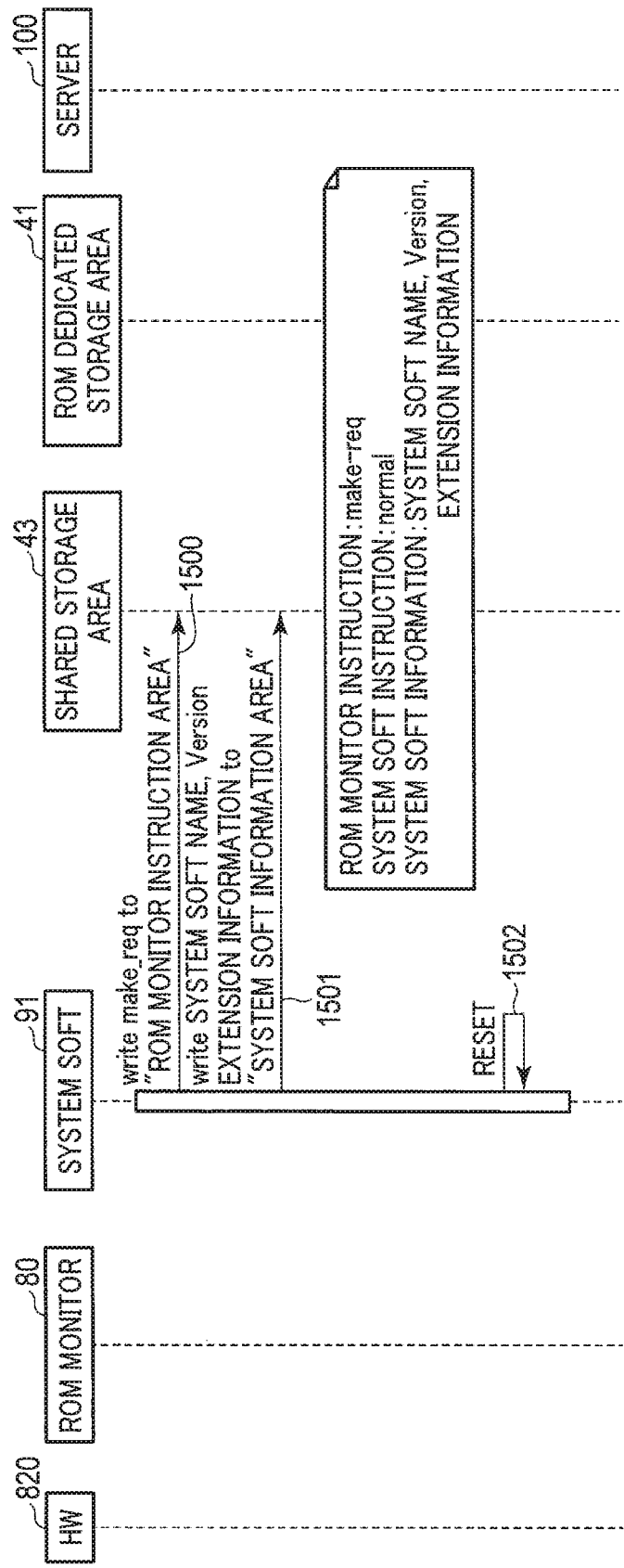
FIG. 15 is a sequence diagram for explaining cooperation of a debug permission request process according to an embodiment.

FIG. 15 is a sequence diagram for explaining the cooperation in the debug permission request process. In the present embodiment, the system soft 91 has a predetermined interface and requests the debug permission from the server 100, with the operation on the interface as a trigger, in a state in which the debugger 20 is connected. As a specific example, the operation of the switch on the board of the controller 10, the transmission of a specific signal from UART, posting from a web interface, or the like is the trigger. In this case, a dealer technician who repairs the vehicle 200, a maker engineer who wishes to investigate the cause of the accident, and the like operate the interface and switch the microcomputer 11 to the debug mode.

As shown in FIG. 15, as the preparation for the debug permission request to the server 100, the system soft 91 rewrites the ROM monitor instruction area 60 of the shared storage area 43 to the instruction (make-req) by the ROM monitor instruction change unit 93 (1500). Therefore, the system soft 91 transfers the debug permission request process to the ROM monitor 80.

Next, the system soft information collection unit 94 of the system soft 91 collects the system soft name, the version, and the extension information as shown in FIG. 11, and writes the collected information in the system soft information area 61 of the shared storage area 43 (1501).

Figure 16:
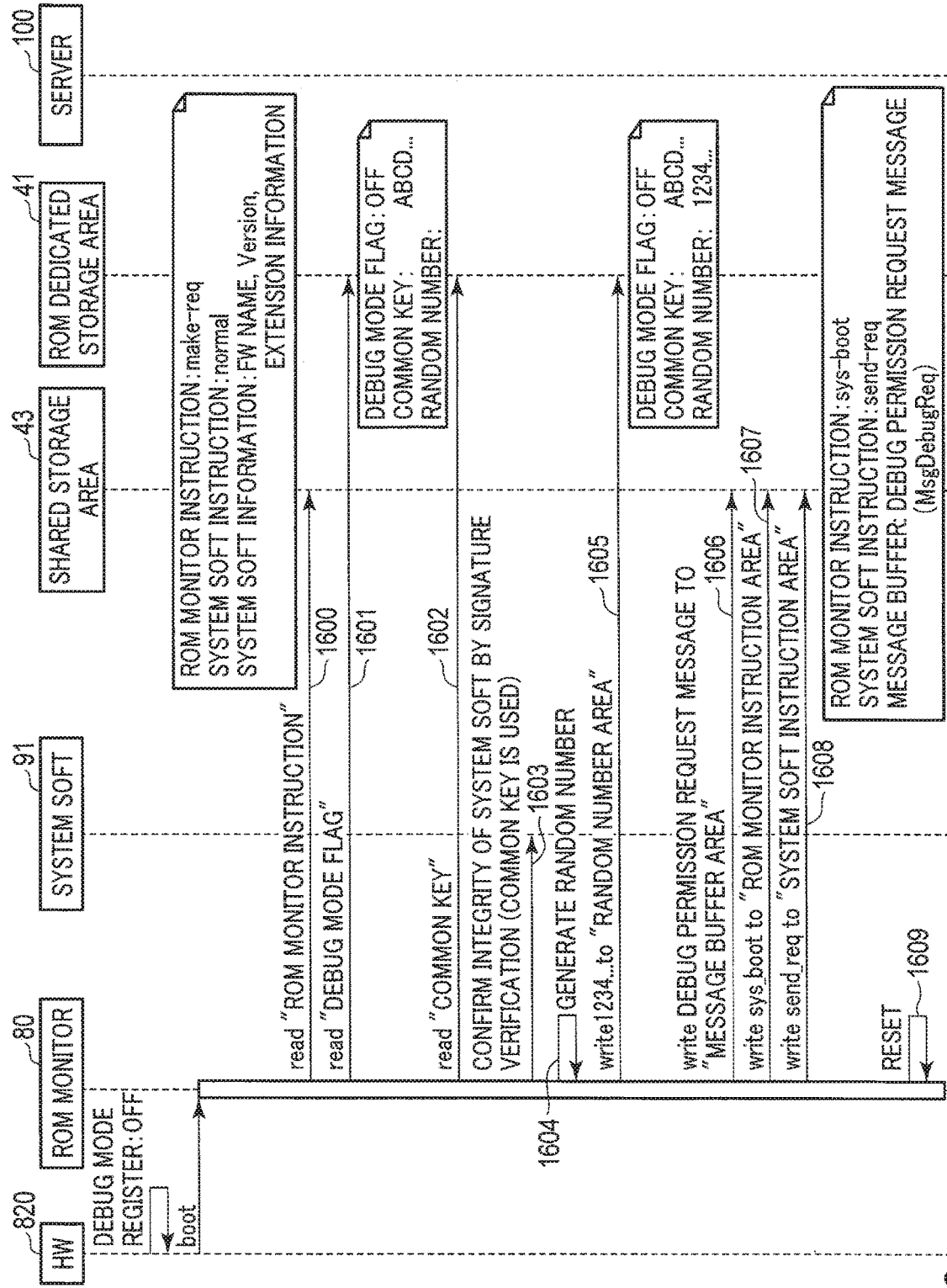
FIG. 16 is a sequence diagram for explaining cooperation of a process of creating a debug permission request message according to an embodiment.

Finally, the system soft 91 executes the reset by the restart unit 95 (1502), and ends the preparation process of the debug permission request. After the reset, the ROM monitor 80 starts the process of creating the debug permission request message according to the instruction (make-req), as shown in FIG. 16.

Here, in the present embodiment, it is the single CPU microcomputer 11, and the ROM monitor 80 and the system soft 91 are operated in this order. When the system soft 91 is activated, the function of transitioning to the ROM monitor 80 is realized by the reset. Generally, in the microcomputer, when the reset is performed, the volatile memory 37, the hardware configuration, and the like are cleared, and the influence of the software operation so far is completely excluded. Therefore, it can be expected that the software that runs afterwards will move as assumed by the developer except for the influence of the bug.

In the present embodiment, the software that operates after the reset is the ROM monitor 80. Therefore, the ROM monitor 80 executes the security-related process related to the debug, thereby ensuring safety. However, it is desirable that the ROM monitor 80 does not add the communication function, excludes those having variable length of reading and writing of the storage area, maintains a relatively small and simple software structure, and excludes vulnerability.

In the present embodiment, since the reset is essential, it is impossible to transmit information using volatile memories (DRAM, SRAM, or the like) that are widely used in multitasking systems. In the general multitasking system, when transmitting information between processes and tasks, a mechanism similar to a shared memory is often used. However, in the present embodiment, when the process is shifted from the system soft 91 to the ROM monitor 80, the reset occurs. Therefore, information cannot be exchanged via the volatile memory. Therefore, even a very simple instruction or information is stored in the nonvolatile memory 36. Therefore, immediately after the activation, the ROM monitor 80 and the system soft 91 determine the items to be processed with reference to the nonvolatile memory 36.

[Process of Creating Debug Permission Request Message]

FIG. 16 is a sequence diagram for explaining the cooperation of the process of creating the debug permission request message.

As above-described, due to the reset by the system soft 91, the HW 820 activates (boots) the ROM monitor 80 while maintaining the OFF of the debug mode register 34. The ROM monitor instruction determination unit 81 of the ROM monitor 80 reads the ROM monitor instruction (make-req) from the ROM monitor instruction area 60 of the shared storage area 43 (1600). Therefore, the ROM monitor 80 starts the process of creating the debug permission request message according to the instruction (make-req).

The ROM monitor 80 reads the flag from the debug mode flag area 50 of the ROM monitor dedicated storage area 41 (1601) and confirms that the debug mode flag is OFF. Therefore, switching to the debug mode is not executed. The ROM monitor 80 will proceed with the subsequent process without receiving any external influence at all.

Next, the system soft verification unit 83 of the ROM monitor 80 verifies the integrity of the system soft 91. First, the ROM monitor 80 reads the common key from the common key area 52 of the ROM monitor dedicated storage area 41 (1602). The common key (ABCD) is a common key held by the microcomputer 11 and the server 100.

Next, the ROM monitor 80 reads the hash value from the system soft confidential information area 62 of the shared storage area 43. The ROM monitor 80 decrypts the encrypted assumed hash value attached to the system soft 91 with the common key and compares the same. When each hash value is equal, the ROM monitor 80 determines that the integrity of the system soft 91 has been verified and determines that the state of the system soft 91 in which the instruction (make-req) is written is correct (1603).

Therefore, the ROM monitor 80 determines that it is not the malicious debug permission request and continues the process. In this case, since the integrity of the system soft 91 has been verified, it is determined that the contents written by the system soft 91 in the system soft information area 61 of the shared storage area 43 is also correct. When the hash values do not match each other, the system soft 91 may have been illegally falsified or modified, and thus the ROM monitor 80 stops the process of creating the debug permission request message.

Next, in the ROM monitor 80, each function unit of the debug permission request message preparation unit 87 cooperates to start the process of preparing the message. First, the random number generator 88 generates a random number (1604). The debug permission request message preparation unit 87 writes the random number (1234) in the random number area 51 of the ROM monitor dedicated storage area 41 (1605). As described later, the random number (1234) is used for countermeasures against replay attacks on the debug permission.

The signature unit 90 executes an electronic signature for the entire debug permission request message by using the common key. The debug permission request message storage unit 89 creates the debug permission request message as shown in FIG. 11 and stores the debug permission request message in the message buffer area 64 of the shared storage area 43 (1606).

Next, when it is recognized that the process of creating the debug permission request message has been completed, the ROM monitor 80 rewrites the ROM monitor instruction area 60 of the shared storage area 43 to the instruction (sys-boot) (1607). Therefore, when the ROM monitor 80 is restarted, the system soft 91 is activated as usual according to the instruction (sys-boot). That is, the process of creating the debug permission request message is not resumed.

Figure 17:
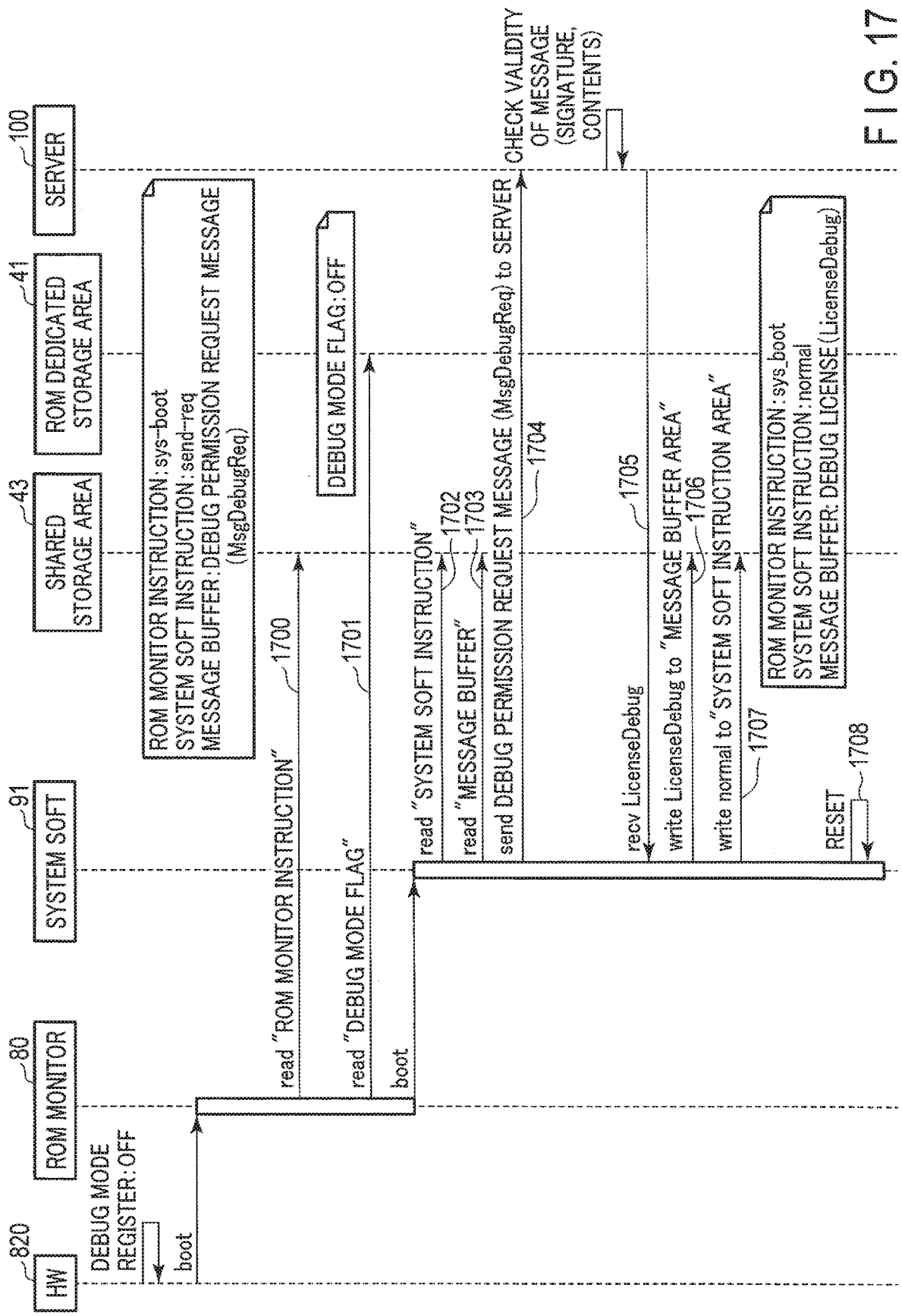
FIG. 17 is a sequence diagram for explaining cooperation of a communication process with a server according to an embodiment.

Finally, the system soft instruction change unit 84 of the ROM monitor 80 rewrites the instruction (send-req) to the system soft instruction area 63 of the shared storage area 43 (1608) and resets (1609). As described later, the instruction (send-req) is an instruction to send the debug permission request message to the system soft 91 on behalf of the ROM monitor 80. The system soft 91 activated after the reset recognizes that a request to send the message has been made by the instruction (send-req), as shown in FIG. 17.

Here, the ROM monitor 80 writes the random number in the random number area 51 of the ROM monitor dedicated storage area 41. This write process is realized by the function of the operation soft determination unit 800 of the HW. That is, since the ROM monitor 80 is in operation, the operation soft determination unit 800 outputs a signal to the memory controller or the control register 33 of the nonvolatile memory 36, and makes the writing to the ROM monitor dedicated storage area 41 temporarily executable. In this case, the ROM monitor 80 will not write incorrect values.

Here, there is an example "MsgDebugReq=Body∥Sign$_m$," representing the debug permission request message (Msg Debug Req) prepared by the ROM monitor 80 in the form of the expression. However, "Body=com_debugReq∥SN∥Ver∥Rnd∥EInfo, Sign=E_K [H [Body]]".

The definition of each element of the expression is as follows. That is, com_debugReq is a command for requesting the server for debug permission. K is a common key shared between the server 100 and the microcomputer 11. SN is the name of the system soft (system soft name). Ver is the version number of the system soft currently used by the microcomputer 11. Rnd is the random number. EInfo is extension information. E_K [A] means common key block encryption of data A by a common key K. H [X] means hash calculation for data X. ∥ means the connection between elements. For example, the connection between data A and data B is expressed as A∥B.

[Communication Process with Server]

FIG. 17 is a sequence diagram explaining the process of cooperation of the communication process with the server 100 and illustrating the process until the debug license is acquired from the server 100.

As shown in FIG. 17, due to the reset by the ROM monitor 80, the HW 820 activates (boots) the ROM monitor 80 while maintaining the OFF of the debug mode register 34. The ROM monitor instruction determination unit 81 of the ROM monitor 80 reads the ROM monitor instruction (sys-boot) from the ROM monitor instruction area 60 of the shared storage area 43 (1700).

In addition, the debug port configuration change unit 86 of the ROM monitor 80 reads the flag from the debug mode flag area 50 of the ROM monitor dedicated storage area 41 (1701) and recognizes that the debug mode flag is OFF. Therefore, the system soft activation unit 82 of the ROM monitor 80 activates the system soft 91 while the debug mode is disabled.

The system soft instruction determination unit 92 of the activated system soft 91 reads the system soft instruction (send-req) from the system soft instruction area 63 of the shared storage area 43 (1702) and recognizes the same. According to the instruction (send-req), the system soft 91 reads the debug permission request message from the message buffer area 64 of the shared storage area 43 (1703).

Next, the debug permission request message transmission unit 97 of the system soft 91 sends the debug permission request message to the server 100 (1704). In this case, the system soft 91 executes the communication process with the server 100 by using an appropriate communication path connected thereto.

As a specific example, UART may be used when the communication server is physically and directly connected, and Ethernet (registered trademark) and TCP/IP may be used as long as Ethernet and TCP/IP are connected to a so-called wired LAN. In the present embodiment, as described above, the communication process with the server 100 is handled by the system soft 91 side. On the other hand, the ROM monitor 80 executes the process of creating the debug permission request message and the process of verifying the debug license, which will be described later, without executing the communication process.

The debug permission determination unit 110 of the server 100 checks the validity (signature) or contents of the debug permission request message and determines whether there is no problem. When there is no problem, the server 100 returns the debug license on the same communication path, and when there is a problem, the server 100 returns the fact.

Here, as an example, the debug permission determination unit 110 executes the determination process by the following procedure. First, the debug permission determination unit 110 extracts the body, which is the main part, from the debug permission request message (Msg Debug Req) shown in the form of the above-mentioned expression, and calculates the hash value H [Body]. Next, the signature ($Sign_m$) is decrypted with the common key K, and D_K [$Sign_m$] that is the assumed hash value is calculated. Here, D_K [Y] means a common key block decryption of Y by the common key K.

The debug permission determination unit 110 compares the two hash values. When the values are equal, the debug permission determination unit 110 verifies that the message (Msg Debug Req) generated by the ROM monitor 80 has not been falsified inside the microcomputer 11 and on the communication path. Next, the debug permission determination unit 110 examines the value of the name (SN) of the system soft 91, and when it is the assumed name and there is no problem, the process proceeds.

The debug permission determination unit 110 manages a plurality of kinds of system soft (microcomputer), and determines the model of the request source with the system soft name (SN). This indicates that the type of the debuggable microcomputer can be increased or decreased even at the time of shipment. That is, even with the microcomputer that cannot be debugged at the time of shipping, there is room for debugging if the information on the server 100 side is updated according to the situation.

In addition, the debug permission determination unit 110 also checks the value of the version (Ver) of the message (Msg Debug Req). Even in this case, a value assumed by the server 100 side is set, and if there is no problem, the process proceeds. There are various possibilities depending on the operation as to which version is subject to debugging permission. For example, when it is an operation policy that always uses the latest soft only, the fact that the debug request comes from the old software itself will be made illegal. Therefore, only the latest version value is assumed. Meanwhile, there is no problem with the latest version of the system soft, but malfunctions may be found only in the specific version and investigation may be performed. In this case, only the value of the specific version is temporarily set as the assumed value.

Finally, the debug permission determination unit 110 checks the extension information (EInfo) of the message (Msg Debug Req). This includes information that cannot be expressed by the system soft name (SN) and the version (Ver). Again, the assumed value is set on the server 100 side, and it is used as the determination material as necessary.

The debug permission determination unit 110 creates the debug license (License Debug) when there is no problem in the three pieces of information of the system soft name (SN), the version (Ver), and the extension information (EInfo), and sends back to the microcomputer 11 side.

The configuration of the debug license (License Debug) can be expressed in the form of the expression "LicenseDebug=Res∥$Sign_1$". However, "Res=resp_debug_ok∥Rnd, $Sign_1$=E_K [H [Res]]".

Here, the random number (Rnd) is not newly generated by the server 100, but is one copied as it is included in the debug permission request message (Msg Debug Req). In addition, resp_debug_ok means a reply (debug license) indicating that the debug has been permitted. On the other hand, resp_degun_ng means a reply indicating that the debug is not permitted. That is, when there is a problem in the debug permission request message (Msg Debug Req) and the debug license cannot be issued, the debug permission determination unit 110 returns a response (resp_degun_ng).

When the debug license (License Debug) is returned from the server 100, the system soft 91 receives the debug license by the debug license reception unit 98 of the communication unit 96 (1705) and writes the debug license to the message buffer area 64 of the shared storage area 43 (1706). When it is recognized that the communication process with the server 100 has been completed, the system soft 91 rewrites the system soft instruction area 63 of the shared storage area 43 to the instruction (normal) (1707) and executes the rest (1708). Therefore, the system soft 91 starts the normal process at the next activation and does not execute the communication process with the server 100.

[Debug License Verification Process]

Figure 18:
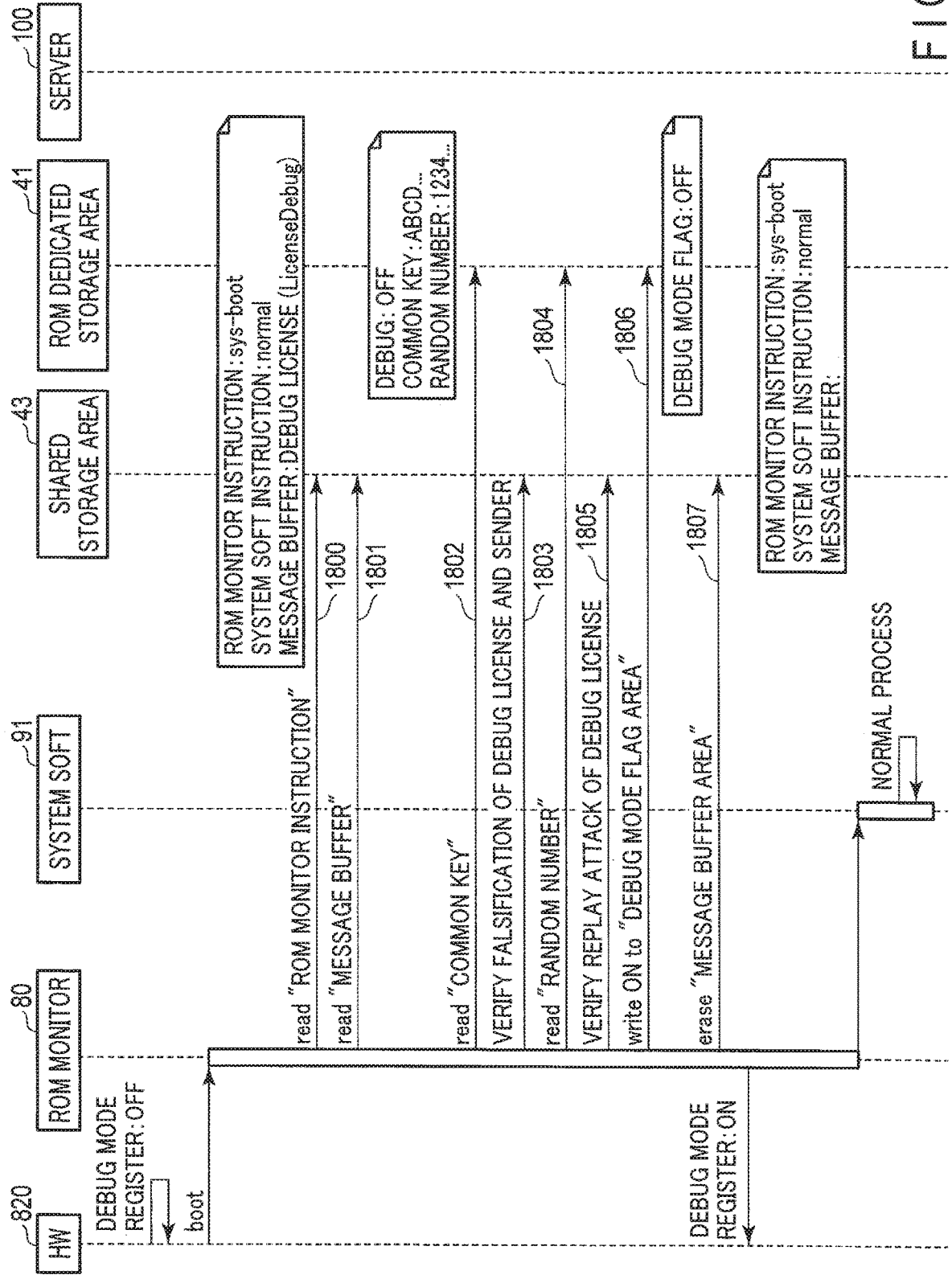
FIG. 18 is a sequence diagram for explaining cooperation of a debug license verification process according to an embodiment.

FIG. 18 describes the cooperation of the debug license verification process and is a sequence diagram illustrating the process until the debug mode is enabled and the debug is permitted.

As shown in FIG. 18, due to the reset by the system soft 91 described above, the HW 820 activates (boots) the ROM monitor 80 in a state in which the OFF of the debug mode register 34 is maintained. The ROM monitor instruction determination unit 81 of the ROM monitor 80 reads the ROM monitor instruction (sys-boot) from the ROM monitor instruction area 60 of the shared storage area 43 (1800) and recognizes the same. Therefore, the ROM monitor 80 starts the debug license verification process, not the process of creating the debug permission request message, and finally proceeds to the process of activating the system soft 91.

The ROM monitor 80 reads the debug license from the message buffer area 64 of the shared storage area 43 (1801). The ROM monitor 80 starts the process of verifying the validity of the debug license by the debug license validity determination unit 85. Specifically, the effectiveness is verified by the following procedure.

The ROM monitor 80 reads the common key (K) from the common key area 52 of the ROM monitor dedicated storage area 41 (1802). Next, the ROM monitor 80 fetches the response body (Res) from the debug license (License Debug) in the form of the above expression and calculates the hash value H [Res]. Next, the signature ($Sign_1$) is decrypted with the common key (K) to calculate the assumed hash value (D_K [$Sign_1$]). When the two values are compared and are equal to each other, the ROM monitor 80 verifies that the debug license has not been falsified and the server 100 that is the assumed sender has replied (1803).

However, the contents that could be confirmed by this verification is up to the fact that the server 100 has allowed the debug in the past. With this fact alone, when the debug permission is given, it will allow replay attacks to reuse the debug license issued in the past many times. That is, there is a fear that system soft that in which the debug has been permitted can be debugged forever. The determination as to whether the debug is possible should be done each time according to the latest situation, and countermeasures are required.

In the present embodiment, the debug license validity determination unit 85 of the ROM monitor 80 executes the verification process as the countermeasure against replay attacks in the following procedure.

First, the ROM monitor 80 reads the random number (1234) from the random number area 51 of the ROM monitor dedicated storage area 41 (1804). The ROM monitor 80 compares the random number with the random number (Rnd) included in the body (Res) of the debug license (License Debug). When the two random numbers match each other, the ROM monitor 80 determines that the replay attack has not been made (1805). On the other hand, when both do not match each other, it is determined that the replay attack has been performed, and the debug license itself is determined to be illegal.

Hereinafter, the basis of the determination will be explained. The random number (1234) stored in the random number area 51 of the ROM monitor dedicated storage area 41 is the value stored by the ROM monitor 80 when the debug permission request message is created. Therefore, the same random number value is always used for the message created most recently by the ROM monitor 80.

On the other hand, the server 100 extracts the random number and copies (embeds) the same into the debug license as it is. Therefore, when the random number is included in the debug license returned from the server 100, it can be inferred that the debug license has been created at a temporally close timing.

The ROM monitor 80 determines that the verification of the validity is successful when the debug license verification process is completed and the instruction (resp_debug_ok) indicating the debug permission is included. The debug port configuration change unit 86 of the ROM monitor 80 sets the debug mode flag to ON (enabled) in the debug mode flag area 50 of the ROM monitor dedicated storage area 41 (1806).

Next, the ROM monitor 80 erases the verified debug license from the message buffer area 64 (1807). Furthermore, the ROM monitor 80 activates the debug function by setting the debug mode of the debug mode register 34 of the control register 33 to be enabled (ON). Therefore, the debug port access restriction unit 810 permits communication (debug access) with the connected debugger 20. After that, the ROM monitor 80 activates the system soft 91. Therefore, the system soft 91 of the microcomputer 11 can be debugged by the external debugger 20.

Hereinafter, whenever the ROM monitor 80 is activated, the ROM monitor 80 accesses the debug mode flag area 50 of the ROM monitor dedicated storage area 41 and checks the contents of the debug mode flag. In this case, the debug mode is enabled (ON) without determining the debug license. Since the persistence of the valid state of the debug mode flag is a problem, as described above, the ROM monitor dedicated storage area 41 is provided with the debuggable-number-of-times area 53. The debuggable number of times is set when the debug mode flag is enabled. After that, the value is reduced whenever the microcomputer 11 is activated in the debug mode. When the debuggable number of times becomes "0", the ROM monitor 80 disables the debug mode flag and restarts the reacquisition of the debug license.

The value to be set as the debuggable number of times is set depending on the use of the microcomputer 11. For example, when it is assumed that the microcomputer 11 is operated in a place where the network environment is poor, there is a possibility that the debug cannot be performed at a necessary timing unless the debuggable number of times is increased. On the other hand, in the case of the microcomputer 11 that strictly restricts the debug, the value of the debuggable number of times is set to "1", so that it is necessary to issue the debug license whenever the debug request is made.

As described above, according to the present embodiment, in the microcomputer having a low-cost single CPU core as a main element, it is possible to realize the debug access restriction function that can reliably perform valid debug access restriction against illegal external debug. Therefore, it is possible to prevent a situation in which the software of the microcomputer is illegally operated, analyzed, or falsified from malicious external sources.

Furthermore, according to the present embodiment, a highly secure ROM monitor requests the server, which is a different computer from the microcomputer, to determine whether the debug is possible, in response to the external debug request. The ROM monitor executes the process of enabling or disabling the debug function of the microcomputer based on the debug license from the server.

That is, by implementing the configuration for separating the authority for determining whether the debug is possible to the server side, it is possible to secure the security aspect to the outside and realize the reliable debug access restriction function even in the case of a low cost microcomputer. In addition, since the server side determines whether the debug is possible, the operation side of the server can unify manage the debug state of the microcomputer even after shipment of the product incorporating the microcomputer.

Although the present embodiment is applied to the microcomputer mounted on the vehicle, the present invention is not limited thereto, but can also be applied to a microcomputer incorporated in, for example, household electrical equipment or medical equipment. In addition, the present embodiment can also be applied to the external request of changing the system soft.

Modification

FIG. 20 is a block diagram related to a modification of the present embodiment. In the present modification, in the function of the microcomputer 11 of the present embodiment illustrated in FIG. 8, an A/D converter control unit 830 and a confidential information erasure unit 840 included in the ROM monitor 80 are added as peripheral circuits included in the HW. Since the other configurations are the same as those of the present embodiment, the description thereof will be omitted.

Both the A/D converter control unit 830 and the confidential information erasure unit 840 of the modification are constituent elements intended to prevent leakage of confidential information in the microcomputer 11. Here, in the modification, the confidential information in the microcomputer 11 includes two types of information, that is, the common key of the ROM monitor dedicated storage area 41 and the system soft confidential information stored in the system soft confidential information area 62 of the shared storage area 43.

From the viewpoint of security at the time of executing each process of the present embodiment, the common key is important so as to ensure security. In the present embodiment, since only the highly safe ROM monitor 80 has the common key read authority and does not include the process of storing the common key externally as it is, the possibility of leakage of the common key is extremely low. On the other hand, since the common key is written before shipment of the microcomputer and no update is basically assumed, the influence is great at the time of leakage.

In addition, the system soft confidential information is greatly influenced by leakage among the information stored during the normal process of the system soft 91. For example, ID, password, operation log (audio data, facial image, or the like) used by the user are representative examples. Even during the debug, some of these may contain information that should not be shown to the operator. Therefore, the designer of the system soft 91 previously designs the system soft confidential information.

The procedure for preventing leakage of confidential information in the microcomputer 11 will be described below.

First, when the common key is used as the confidential information, the path from which the common key leaks is the output from the microcomputer 11 at the time of power analysis. The power analysis is a process of estimating information, which is originally difficult to acquire by software, by analyzing electrical characteristics. Specifically, in the microcomputer 11, when the signature verification process using the common key is performed, there is a possibility that the common key value will leak at the time of outputting the measurement value by measuring the power consumption and noise of the microcomputer 11. Therefore, while the microcomputer 11 uses the common key, it is desirable to devise not to allow the external measurement to accompany power analysis during the calculation process.

Therefore, in the present modification, while the operation of the common key is performed by the ROM monitor 80 (for example, during the operation of the encryption unit 38), the A/D converter control unit 830 stops the operation of the circuit for performing the power analysis by the output from the microcomputer 11. As the typical circuit for performing the power analysis, an A/D converter may be connected as an external interface. That is, there is a possibility that the contents of the arithmetic process of the microcomputer 11, for example, are illegally acquired via the A/D converter.

Therefore, in the present modification, the A/D converter control unit 830 shuts off the power supply to the external interface and stops the operation of the A/D converter. However, not only in the A/D converter but also in the other circuits connected as the external interface, a control unit is required for stopping the operation during the calculation process using the common key by the microcomputer 11.

Furthermore, when the system soft 91 is operated in the microcomputer 11, the system soft confidential information may be stored in the system soft confidential information area 62 of the shared storage area 43 along with the normal process. After the storage, according to the request, for example, when the ROM monitor 80 executes the process of enabling the debug mode flag, the confidential information erasure unit 840 of the ROM monitor 80 immediately erases the contents of the system soft confidential information area 62. Consequently, it is possible to prevent a situation in which confidential information from the system soft confidential information area 62 leaks to the operator who performs the debug.

In order to maintain the simplicity of the ROM monitor 80, the system soft confidential information area 62 has a fixed length. Therefore, the capacity of the system soft confidential information area 62 may be insufficient depending on the capacity of the system soft confidential information stored by the system soft. In this case, the system soft 91 may independently encrypt the system soft confidential information, and only the key used at that time may be stored in the system soft confidential information area 62. Therefore, the key is reliably erased at the time of the debug, and the encrypted system soft confidential information cannot be restored. Since the capacity of the nonvolatile memory 36 prepared for the normal process of the system soft is larger than that of the system soft confidential information area 62, there is no practical restriction on the capacity of confidential information by the corresponding operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus being applied to an embedded system in an electric device, comprising:
   a processor; and
   a nonvolatile memory including a first memory area being rewritable and storing a system software being executable by the processor directly, and a second memory area in which rewriting is prohibited and storing a ROM monitor being executable by the processor directly,
   wherein the processor is configured to:
   request, using the system software and the ROM monitor, a server different from the information processing apparatus to determine whether a debug or software change is possible in response to external access;
   create, using the ROM monitor, a message for requesting the server to determine whether the debug is possible;
   transmit the message to the server using the system software; and
   create the message including first information specifying a software stored in the first memory area subjected to debug, the first information including a predetermined identifier extracted from a digital signature.

2. The information processing apparatus of claim 1, wherein the processor is configured to request, using the system software and the ROM monitor, the server to determine whether a request for the debug is possible.

3. The information processing apparatus of claim 1, wherein
   the processor is configured to collect the first information using the system software.

4. The information processing apparatus of claim 1, wherein
   the processor is configured to determine whether the system software is executed or the ROM monitor is executed.

5. The information processing apparatus of claim 4, wherein
   the nonvolatile memory includes a third memory area in which rewriting is prohibited when the system software is executed and being rewritable when the ROM monitor is executed.

6. The information processing apparatus of claim 4, further comprising
   a register being rewritable once after the processor is reset.

7. A system comprising:
   the information processing apparatus of claim 1; and a network which enables second information exchange by communication between the information processing apparatus and the server.

8. The system of claim 7, wherein the processor of the information processing apparatus is configured to create, using the ROM monitor, a message for requesting the server to determine whether the debug is possible and transmit, using the system software, the message to the server, and the server is configured to:
verify validity of the message;
determine whether the debug is possible based on the message; and
transmit the determination result of whether the debug is possible to the information processing apparatus.

9. A method of controlling a debug by a system software and a ROM monitor that a processor in an embedded system performs and that a nonvolatile memory stores, the method comprising:
receiving external access for requesting of a debug;
requesting, using the first system software and the ROM monitor, a server different from the computer to determine whether the debug is possible;
creating, using the ROM monitor, a message for requesting the server to determine whether the debug is possible;
sending, using the system software, the message to the server; and
creating the message including first information specifying a software stored in the first memory area subjected to debug, the first information including a predetermined identifier extracted from a digital signature, wherein:
the system software is executable by the processor directly, and is stored in a first memory area, the first memory area being rewritable and being included in the nonvolatile memory;
the ROM monitor is executable by the processor directly, and is stored in a second memory area, the second memory area in which rewriting is prohibited and being included in the nonvolatile memory.

10. A method of controlling a debug by a system software and a ROM monitor that a processor in an embedded system performs and that a nonvolatile memory stores, further comprising:
receiving external access for requesting of a debug;
requesting, using the system software and the ROM monitor, a server different from the computer to determine whether the debug is possible;
receiving the determination result transmitted from the server using the system software; and
verifying validity of the determination result using the ROM monitor, wherein:
the system software is executable by the processor directly, and is stored in a first memory area, the first memory area being rewritable and being included in the nonvolatile memory;
the ROM monitor is executable by the processor directly, and is stored in a second memory area, the second memory area in which rewriting is prohibited and being included in the nonvolatile memory.

11. The method of claim 10, further comprising
enabling, using the ROM monitor, the debug if the debug is permitted according to the determination result when the determination result has the validity.

12. An information processing apparatus being applied to an embedded system in an electric device, comprising:
a processor; and
a nonvolatile memory including a first memory area being rewritable and storing a system software being executable by the processor directly, and a second memory area in which rewriting is prohibited and storing a ROM monitor being executable by the processor directly,
wherein the processor is configured to:
request, using the system software and the ROM monitor, a server different from the information processing apparatus to determine whether a debug or software change is possible in response to external access;
control, using the ROM monitor, of enabling or disabling of the debug based on the determination result of the server indicating whether the debug is possible;
receive the determination result transmitted from the server using the system software; and
verify validity of the determination result using the ROM monitor.

13. The information processing apparatus of claim 12, wherein
the processor is configured to enable, using the ROM monitor, the debug if the debug is permitted according to the determination result when the determination result has the validity.

14. The information processing apparatus of claim 12, wherein
the processor is configured to request, using the system software and the ROM monitor, the server to determine whether a request for the debug is possible.

15. The information processing apparatus of claim 12, wherein
the processor is configured to determine whether the system software is executed or the ROM monitor is executed.

16. The information processing apparatus of claim 15, wherein
the nonvolatile memory includes a third memory area in which rewriting is prohibited when the system software is executed and being rewritable when the ROM monitor is executed.

17. The information processing apparatus of claim 15, further comprising
a register being rewritable once after the processor is reset.

18. A system comprising:
the information processing apparatus of claim 12; and
a network which enables second information exchange by communication between the information processing apparatus and the server.

19. The system of claim 18, wherein the processor of the information processing apparatus is configured to create, using the ROM monitor, a message for requesting the server to determine whether the debug is possible and transmit, using the system software, the message to the server, the server is configured to:
verify validity of the message;
determine whether the debug is possible based on the message; and
transmit the determination result of whether the debug is possible to the information processing apparatus.

* * * * *